US008169555B2

(12) United States Patent
Mitsui et al.

(10) Patent No.: US 8,169,555 B2
(45) Date of Patent: *May 1, 2012

(54) LIQUID CRYSTAL DISPLAY DEVICE

(75) Inventors: Masashi Mitsui, Anpachi-cho (JP);
Norio Koma, Motosu-gun (JP);
Tomohide Onogi, Anpachi-cho (JP);
Yasuo Segawa, Motosu-gun (JP)

(73) Assignee: Sony Corporation, Tokyo (JP)

( * ) Notice: Subject to any disclaimer, the term of this patent is extended or adjusted under 35 U.S.C. 154(b) by 1066 days.

This patent is subject to a terminal disclaimer.

(21) Appl. No.: 11/902,032

(22) Filed: Sep. 18, 2007

(65) Prior Publication Data

US 2008/0068523 A1    Mar. 20, 2008

(30) Foreign Application Priority Data

Sep. 19, 2006  (JP) ................................ 2006-252659
Dec. 28, 2006  (JP) ................................ 2006-356455

(51) Int. Cl.
*G02F 1/133* (2006.01)
*G02F 1/1335* (2006.01)

(52) U.S. Cl. ............................... 349/37; 349/33; 349/19

(58) Field of Classification Search ..................... 349/37
See application file for complete search history.

(56) References Cited

U.S. PATENT DOCUMENTS

| 6,768,481 B2 * | 7/2004 | Ozawa et al. ................... 345/87 |
| 6,781,655 B2 | 8/2004 | Yamazaki et al. |
| 6,853,421 B2 | 2/2005 | Sakamoto et al. |
| 6,914,656 B2 * | 7/2005 | Sakamoto et al. ............ 349/141 |
| 7,586,575 B2 | 9/2009 | Higa et al. |
| 7,800,722 B2 | 9/2010 | Ohyama et al. |
| 7,924,384 B2 | 4/2011 | Nakayoshi et al. |
| 2002/0012088 A1 | 1/2002 | Ozawa et al. |
| 2004/0105059 A1 | 6/2004 | Ohyama et al. |
| 2004/0150600 A1 | 8/2004 | Kojima et al. |
| 2004/0217935 A1 * | 11/2004 | Jeon et al. ...................... 345/100 |
| 2005/0094067 A1 | 5/2005 | Sakamoto et al. |
| 2006/0187387 A1 | 8/2006 | Ohyama et al. |

(Continued)

FOREIGN PATENT DOCUMENTS

CN              1474216 A        2/2004

(Continued)

OTHER PUBLICATIONS

Japanese Office Action issued Dec. 13, 2011, for corresponding Japanese Appln. No. 2008-205335.

*Primary Examiner* — David Nelms
*Assistant Examiner* — Sang Nguyen
(74) *Attorney, Agent, or Firm* — K&L Gates LLP

(57) ABSTRACT

A liquid crystal display device includes a first substrate having a first electrode and a second electrode, a second substrate, a liquid crystal interposed between the first substrate and the second substrate, pixels each having a transmissive portion for performing a transmissive display and a reflective portion for performing a reflective display, and a driving circuit driving the pixels. Here, a third electrode is disposed in the second substrate opposed to the first substrate with the liquid crystal interposed therebetween. The first electrode is disposed in the transmissive portion along with the second electrode and is also disposed in the reflective portion along with the third electrode. The driving circuit is provided to independently apply potentials to the second electrode and the third electrode.

5 Claims, 16 Drawing Sheets

U.S. PATENT DOCUMENTS

| | | | |
|---|---|---|---|
| 2006/0187388 A1 | 8/2006 | Ohyama et al. | |
| 2007/0002226 A1* | 1/2007 | Sakamoto et al. | 349/114 |
| 2007/0008470 A1* | 1/2007 | Higa | 349/114 |
| 2007/0046606 A1* | 3/2007 | Kim et al. | 345/90 |
| 2007/0091050 A1* | 4/2007 | Katayama et al. | 345/98 |
| 2007/0222907 A1* | 9/2007 | Onogi et al. | 349/42 |
| 2008/0068523 A1 | 3/2008 | Mitsui et al. | |
| 2008/0106541 A1* | 5/2008 | Yamazaki | 345/212 |
| 2008/0165309 A1* | 7/2008 | Ge et al. | 349/85 |

FOREIGN PATENT DOCUMENTS

| | | |
|---|---|---|
| CN | 1196962 C | 4/2005 |
| JP | A-2001-215531 | 8/2001 |
| JP | A 2001-356356 | 12/2001 |
| JP | A-2002-006320 | 1/2002 |
| JP | A-2002-244135 | 8/2002 |
| JP | A-2002-296597 | 10/2002 |
| JP | A 2003-270627 | 9/2003 |
| JP | 2003-322857 | 11/2003 |
| JP | A-2003-322857 | 11/2003 |
| JP | 2003-344837 | 12/2003 |
| JP | A 2003-344837 | 12/2003 |
| JP | A 2004-198922 | 7/2004 |
| JP | A-2004-233807 | 8/2004 |
| JP | A-2004-233808 | 8/2004 |
| JP | A-2004-233968 | 8/2004 |
| JP | A 2005-338256 | 12/2005 |
| JP | A-2006-171376 | 6/2006 |
| JP | A-2007-133293 | 5/2007 |
| JP | A-2008-165054 | 7/2008 |
| JP | A-2008-165069 | 7/2008 |
| WO | 2005-006068 A1 | 1/2005 |

* cited by examiner

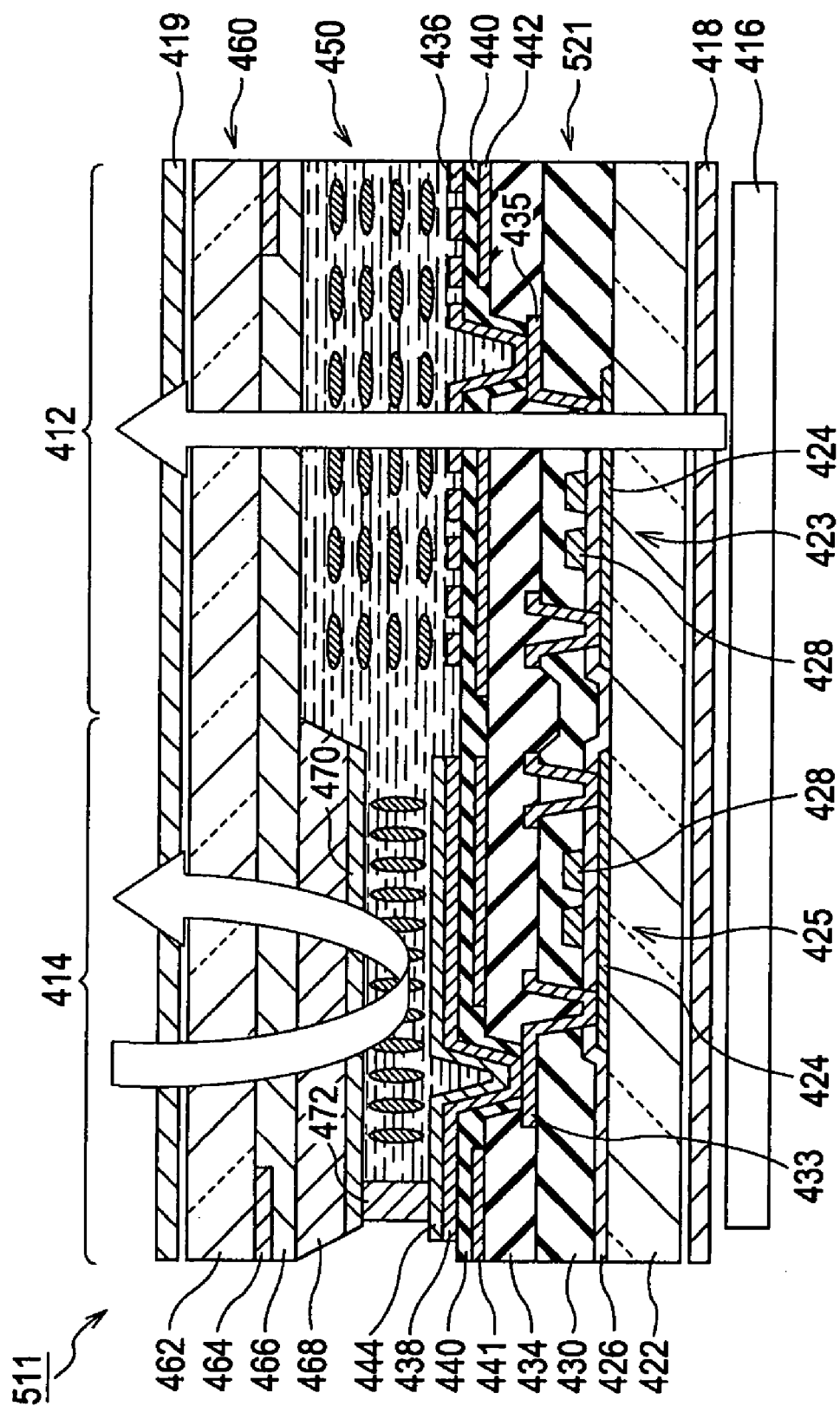

LIQUID CRYSTAL DISPLAY DEVICE

BACKGROUND

1. Technical Field

The present invention relates to a liquid crystal display device, and more particularly, to a liquid crystal display device in which one pixel includes a transmissive portion for performing a transmissive display and a reflective portion for performing a reflective display and two electrodes for controlling the alignment of liquid crystal molecules are disposed in one substrate.

2. Related Art

Liquid crystal panels of an FFS (Fringe Field Switching) type or an IPS (In-Plane Switching) type are known as a liquid crystal panel having a wide viewing angle. In such types, both a pixel electrode and a common electrode are disposed in an element substrate, and liquid crystal molecules are rotated by the control of an electric field generated between both electrodes, thereby controlling alignment of the liquid crystal molecules.

The liquid crystal panels are approximately classified into a transmissive type of making a display by the use of a backlight, a reflective type of making a display by the use of an external light, and a transflective type having both the transmissive and reflective structures in one pixel.

JP-A-2003-270627, JP-A-2004-198922, JP-A-2005-338256, and JP-A-2003-344837 are examples of the related art.

The known transflective liquid crystal panels of a TN type and an ECB type do not have sufficient contrast and have a narrow viewing angle. The transflective liquid crystal panels of a VA type have high contrast and an enlarged viewing angle, but have a problem in that colors are changed in viewing from an angle.

In contrast to these TN type or ECB type liquid crystal panels, the transflective liquid crystal panels of an FFS type or an IPS type have excellent viewing-angle characteristic and have significantly small color changes in viewing from an angle, which is a problem of the VA type. However, it is necessary to dispose a retardation film or a wave plate so as to allow a transmissive display and a reflective display to coexist, which causes a problem with a decrease in contrast. In addition, there is also a problem in that the liquid crystal display device gets thicker than the transmissive liquid crystal display device of an FFS type or an IPS type.

SUMMARY

An advantage of some aspects of the invention is that it provides a liquid crystal display device with excellent display quality, in which a transmissive portion for performing a transmissive display and a reflective portion for performing a reflective display are disposed in each pixel and two electrodes controlling a liquid crystal are disposed in one substrate.

According to an aspect of the invention, there is provided a liquid crystal display device including: a first substrate having a first electrode and a second electrode; a second substrate; a liquid crystal interposed between the first substrate and the second substrate; pixels each having a transmissive portion for performing a transmissive display and a reflective portion for performing a reflective display; and a driving circuit driving the pixels. Here, a third electrode is disposed in the second substrate opposed to the first substrate with the liquid crystal interposed therebetween, the first electrode is disposed in the transmissive portion along with the second electrode and is also disposed in the reflective portion along with the third electrode, and the driving circuit is provided to independently apply potential to the second electrode and the third electrode.

According to the above-mentioned configuration, the reflective portion can be controlled by the use of the first electrode disposed in the first substrate and the third electrode disposed in the second substrate, respectively, thereby embodying a transflective liquid crystal display device in which the transmissive portion is formed in an FFS type with a wide viewing angle. Here, since a retardation layer is not disposed in the transmissive portion, it is possible to suppress a deterioration in contrast of the transmissive portion due to the retardation layer.

When an OFF voltage is applied across the first electrode and the second electrode in the transmissive portion, an ON voltage may be applied across the first electrode and the third electrode in the reflective portion to align the liquid crystal in the reflective portion to be approximately perpendicular to the third electrode, thereby allowing the transmissive portion and the reflective portion to simultaneously make a dark display.

When an OFF voltage is applied across the first electrode and the third electrode in the reflective portion, an ON voltage may be applied across the first electrode and the second electrode to align the liquid crystal in the transmissive portion to be twisted around the normal line of the second electrode, thereby allowing the transmissive portion and the reflective portion to simultaneously make a bright display.

According to another aspect of the invention, there is provided a liquid crystal display device including: a first substrate; a second substrate; a liquid crystal interposed between the first substrate and the second substrate; and pixels each having a transmissive portion for performing a transmissive display and a reflective portion for performing a reflective display. Here, the first substrate includes: a plurality of data lines and a plurality of gate lines; a plurality of switching elements disposed to correspond to intersections between the plurality of data lines and the plurality of gate lines; a plurality of first electrodes connected to output terminals of the plurality of switching elements, respectively; and a second electrode driving liquid crystal molecules by applying an electric field between the first electrodes and the second electrode. The second substrate includes a third electrode driving the liquid crystal molecules by applying an electric field between the first electrode and the third electrode. The potential of the second electrode and the potential of the third electrode are opposite in phase to each other.

The liquid crystal display device may further include a control circuit setting the potential of the second electrode and the potential of the third electrode, which share the corresponding gate line, so as to be opposite in phase to each other, inverting the potential in a flyback time just before a selection signal is input to the corresponding gate line, and then maintaining the potential in a 1 vertical period even after the selection signal is input.

According to another aspect of the invention, there is provided a liquid crystal display device including: a first substrate; a second substrate; a liquid crystal interposed between the first substrate and the second substrate; and pixels each having a transmissive portion for performing a transmissive display and a reflective portion for performing a reflective display. The first substrate includes: a plurality of data lines and a plurality of gate lines; a plurality of switching elements disposed to form a pair corresponding to each intersection between the plurality of data lines and the plurality of gate lines; first electrodes disposed in the reflective portion and the transmissive portion connected to output terminals of the pair of switching elements, respectively; and a plurality of second electrodes driving the liquid crystal by applying an electric field between the first electrodes and the second electrodes. The second substrate includes a third electrode driving the liquid crystal by applying an electric field between the first electrodes and the third electrode. The potential of the second electrode and the potential of the third electrode are opposite in phase to each other.

The third electrodes of the gate lines may be connected as a reflective-display common electrode terminal to each other outside a display area and the second electrodes of the gate lines may be connected as a transmissive-display common electrode terminal to each other outside the display area. Here, the potential of the reflective-display common electrode terminal and the potential of the transmissive-display common electrode terminal may be opposite in phase to each other and the potential is inverted every horizontal period.

The third electrodes in odd rows of the gate lines and the second electrodes in even rows thereof may be connected as a first common electrode terminal to each other outside the display area and the third electrodes in the even rows of the gate lines and the second electrodes in the odd rows thereof may be connected as a second common electrode terminal to each other outside the display area. The potential of the first common electrode terminal and the potential of the second common electrode terminal may be opposite in phase to each other and the potential is inverted every screen scanning.

The first substrate may have a reflective-display storage capacitor disposed in the reflective portion.

The reflective-display storage capacitor may have a reflective-display storage capacitor electrode that forms a storage capacitor along with the first electrode. The potential of the reflective-display storage capacitor electrode may be equal to the potential of the reflective-display common electrode terminal.

The thickness of the liquid crystal may be set so that a phase difference of the reflective portion is $\Delta nd$ $\lambda/4$ and a phase difference of the transmissive portion is $\Delta nd=\lambda/2$.

With the above-mentioned configurations, it is possible to provide a liquid crystal display device with excellent display quality, in which one pixel includes a transmissive portion and a reflective portion and two electrodes for controlling the alignment of liquid crystal molecules are disposed in one substrate.

BRIEF DESCRIPTION OF THE DRAWINGS

The invention will be described with reference to the accompanying drawings, wherein like numbers reference like elements.

FIG. 16 is a cross-sectional view illustrating a liquid crystal display device having another configuration according to an embodiment of the invention.

DESCRIPTION OF EXEMPLARY EMBODIMENTS

Hereinafter, exemplary embodiments of the invention will be described in detail with reference to the drawings.

Figure 1:
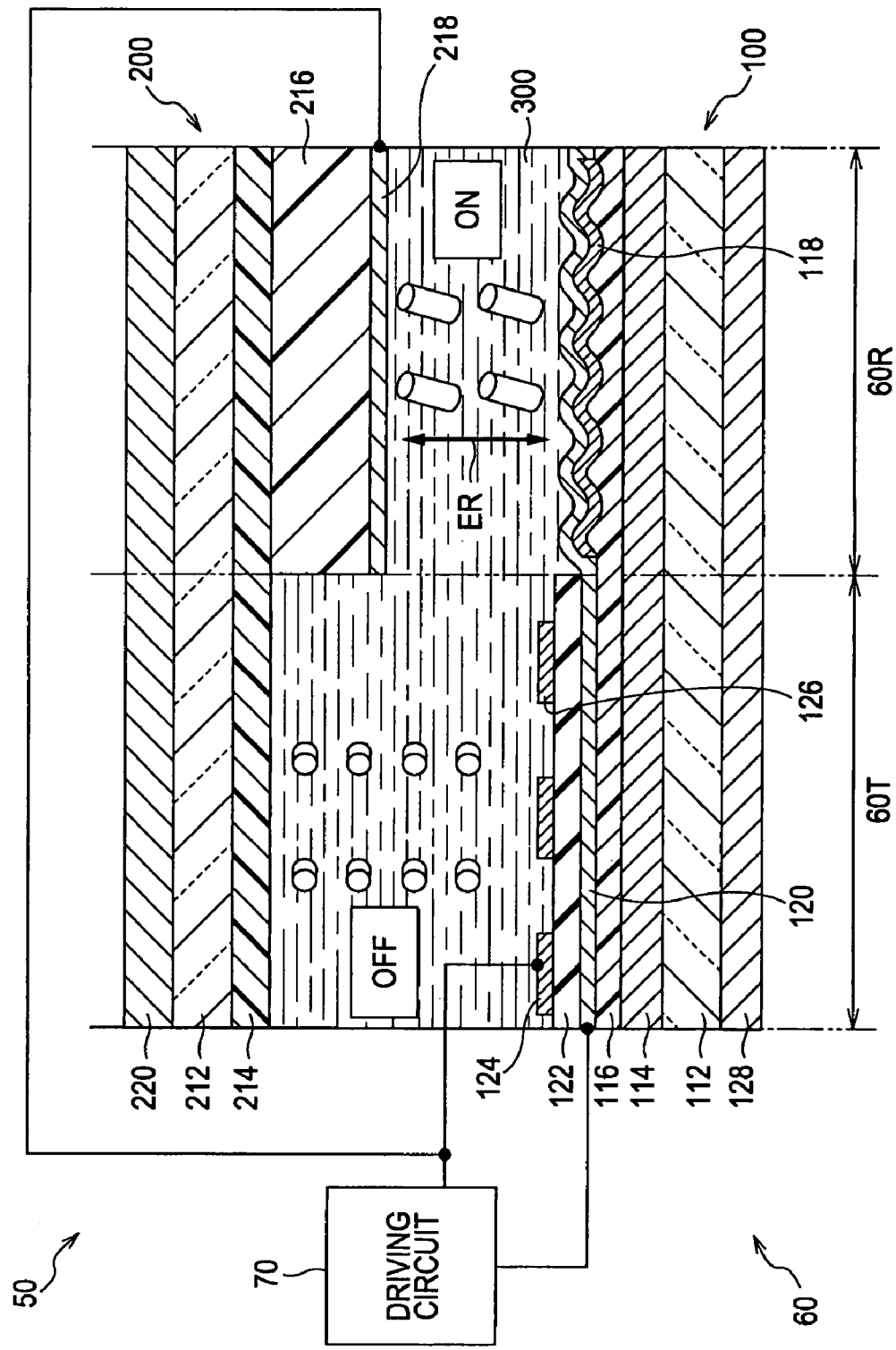
FIG. 1 is a schematic diagram illustrating a liquid crystal display device according to an embodiment of the invention.
Figure 2:
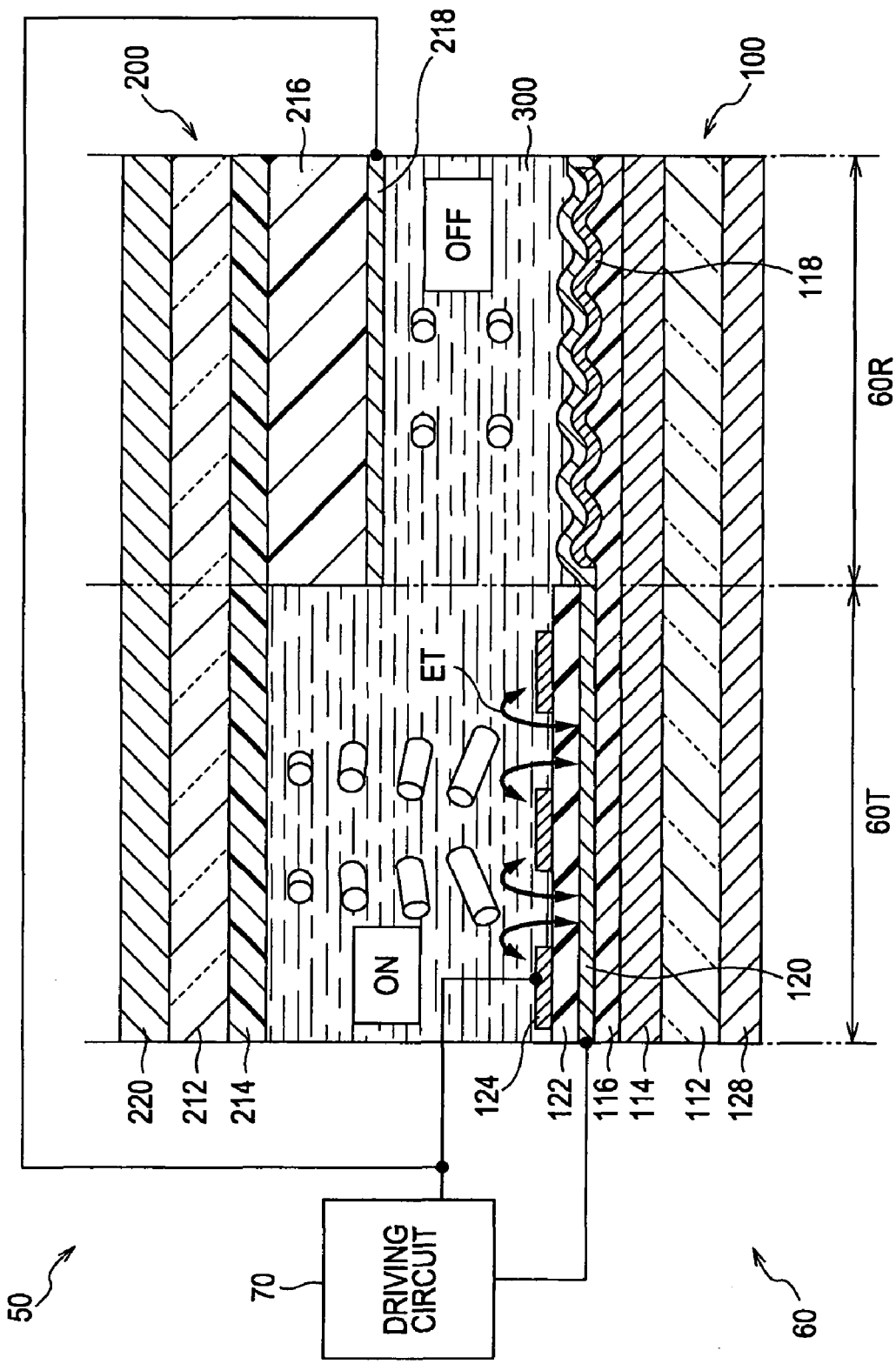
FIG. 2 is a schematic diagram illustrating the liquid crystal display device according to the embodiment of the invention.

FIGS. 1 and 2 are schematic diagrams illustrating a liquid crystal display device 50 according to an embodiment of the invention. The liquid crystal display device 50 includes a liquid crystal panel 60, a driving circuit 70 driving the liquid crystal panel 60, and a backlight unit (not shown) opposed to the liquid crystal panel 60. In FIG. 1, etc., one pixel (which is also called a dot or a sub pixel) of the liquid crystal panel 60 is shown in a cross-sectional view and only partial elements are hatched so as to avoid complication of the drawings.

The liquid crystal panel 60 is a transflective liquid crystal panel in which a transmissive portion 60T for performing a transmissive display and a reflective portion 60R for performing a reflective display are disposed in one pixel. The transmissive portion 60T and the reflective portion 60R each indicate not only a two-dimensional area as viewed in a plane view, but also a three-dimensional area of the liquid crystal panel 60 defined by projecting the two-dimensional area in the thickness direction of the liquid crystal panel 60, that is, the overlapping direction of substrates 100 and 200 to be described later.

Here, it is assumed that the liquid crystal panel 60 performs the transmissive display in an FFS (Fringe Field Switching) type and performs the reflective display in an ECB (Electrically Controlled Birefringence) type.

The liquid crystal panel 60 includes an element substrate 100, a counter substrate 200 opposed to the element substrate 100, and a liquid crystal (or a liquid crystal layer) 300 disposed between both substrates 100 and 200. Liquid crystal molecules in the liquid crystal layer 300 are schematically illustrated in the figure.

The element substrate 100 includes a light-transmitting substrate 112 and further includes a circuit layer 114, a planarizing film 116, a reflective film 118, a first electrode 120, an insulating film 122, a second electrode 124, and an alignment film (not shown) inside the light-transmitting substrate 112, that is, on a side of the substrate 112 close to the liquid crystal layer 300.

The light-transmitting substrate 112 is formed of, for example, a transparent glass plate.

The circuit layer 114 is a layer in which circuits having a variety of elements are formed to drive the pixel and includes, for example, pixel TFTs (Thin Film Transistor) or a variety of wires. Although details of the circuits are not shown, a variety of circuits can be used. The circuit layer 114 is disposed over the transmissive portion 60T and the reflective portion 60R on the light-transmitting substrate 112.

The planarizing film 116 is made of, for example, insulating or light-transmitting resin and is disposed over the circuit layer 114 so as to be closer to the liquid crystal layer 300 than the circuit layer 114. The planarizing film 116 extends over the transmissive portion 60T and the reflective portion 60R. The surface of the planarizing film 116 close to the counter substrate 200 is even in the transmissive portion 60T and is uneven in the reflective portion 60R. The unevenness can be formed by various methods and may be formed, for example, by forming the planarizing film 116 out of a photo resist material and exposing and developing the photo resist material in a pattern.

The reflective film 118 is formed of a material such as aluminum capable of reflecting an external light (visible light) for the purpose of a reflective display. The reflective film 118 is disposed in the reflective portion 60R and is located on the uneven surface of the planarizing film 116. The surface of the reflective film 118 close to the counter substrate 200 has the same uneven shape as the uneven surface of the planarizing film 116.

The first electrode 120 is formed of a light-transmitting conductive material such as ITO (Indium Tin Oxide). The first electrode 120 is disposed on the planarizing film 116 so as to cover the reflective film 118. The first electrode 120 is disposed in the transmissive portion 60T and the reflective portion 60R. That is, the first electrode is an electrode common to the transmissive portion 60T and the reflective portion 60R. The surface of the first electrode 120 close to the counter substrate 200 is even in the transmissive portion 60T and has the same uneven shape as the uneven surfaces of the reflective film 118 and the planarizing film 116.

When the reflective film 118 is conductive, the first electrode 120 may not cover the entire reflective film 118 connected to the reflective film 118. That is, a portion of the first electrode 120 in the reflective portion 60R may be formed of the reflective film 118.

Although the connection of the first electrode 120 to the driving circuit 70 is schematically illustrated in FIG. 1, etc. for the purpose of explanation, the application of potential to the first electrode 120 is performed through, for example, the pixel TFT in the circuit layer 114.

The insulating film 122 is made of, for example, silicon oxide or silicon nitride. The insulating film 122 is disposed on the even surface of the first electrode 120 in the transmissive portion 60T. The surface of the insulating film 122 close to the counter substrate 200 is even.

The second electrode 124 is formed of a light-transmitting material such as ITO. The second electrode 124 is disposed on the insulating film 122 in the transmissive portion 60T and is opposed to the first electrode 120 with the insulating film 122 interposed therebetween. That is, the first electrode 120, the insulating film 122, and the second electrode 124 are stacked in this order. Both electrodes 124 and 120 are disposed on the element substrate 100 and thus are located on the same side about the liquid crystal layer 300. Slits 126 are formed in portions of the second electrode 124 opposed to the first electrode 120. Here, the slits 126 extend substantially perpendicular to the figure surface. An electric field ET due to a potential difference between the first electrode 120 and the second electrode 124 is generated with the slits 126 and the insulating film 122 interposed therebetween (see FIG. 2). The alignment state of the liquid crystal 300 in the transmissive portion 60T is controlled by the electric field ET.

Although the connection of the second electrode 124 to the driving circuit 70 is schematically illustrated in FIG. 1, etc. for the purpose of explanation, the application of potential to the second electrode 124 is performed through, for example, wires in the circuit layer 114.

The alignment film not shown is disposed to cover the second electrode 124, the insulating film 122, and the first electrode 120 and is in contact with the liquid crystal 300.

The counter substrate 200 includes a light-transmitting substrate 212 and further includes a color filter 214, a retardation layer 216, a third electrode 218, and an alignment film (not shown) in the inside of the light-transmitting substrate 212, that is, on a side closer to the liquid crystal layer 300 than the substrate 212.

The light-transmitting substrate 212 is formed of, for example, a transparent glass plate.

The color filter 214 is made of, for example, a dyed resin and is disposed on the light-transmitting substrate 212 over both the transmissive portion 60T and the reflective portion 60R. A backlight light incident from the element substrate 100 and an external light are colored by the color filter 214 and the pixel is lighted in a predetermined color. The color of the color filter 214 is set to correspond to a display color (single color) of the corresponding pixel. A unit consisting of a plurality of pixels adjacent to each other is called a pixel.

For example, it is assumed that the retardation layer 216 corresponds to a quarter wave (¼ wavelength) plate. In this case, linearly polarized light can be converted into clockwise (or counterclockwise) circularly polarized light by the retardation layer 216. The retardation layer 216 is located closer to the liquid crystal layer 300 than the color filter 214 and is disposed on the color filter 214 in the reflective portion 60R. In this case, the retardation layer 216 is built in the liquid crystal panel 60. Here, the term "built in" means a disposal form that something is disposed between the light-transmitting substrates 112 and 212. It can be understood that the pixel TFT and the like are built in the liquid crystal panel 60.

The retardation layer 216 can be formed of, for example, a UV-curable liquid crystal (liquid crystal which is curable by ultraviolet rays). More specifically, an alignment film (not shown) is formed on the color filter 214, the UV-curable liquid crystal in a liquid phase is applied onto the alignment film, and then the UV is radiated thereto, thereby forming the retardation layer 216. In this case, the retardation layer 216 includes the UV-curable liquid crystal or further includes the alignment film. The alignment film serves to control the alignment of the UV-curable liquid crystal, but does not serve to define the alignment of the liquid crystal 300. A variety of alignment films can be used as the alignment film for the UV-curable liquid crystal. For example, an optical alignment film having a liquid crystal aligning ability with an application of light can be used and the use of the optical alignment film makes a rubbing operation unnecessary. The UV-curable liquid crystal serves as a wave plate by performing a UV curing process thereon (radiating the UV to cure the liquid crystal). The phase difference can be adjusted by varying the thickness of the UV-curable liquid crystal.

The third electrode 218 is made of a light-transmitting conductive material such as ITO. The third electrode 218 is located closer to the liquid crystal layer 300 than the retardation layer 216 and is disposed on the retardation layer 216 in the reflective portion 60R so as to be opposed to the first electrode 120 with the liquid crystal layer 300 interposed therebetween. That is, the third electrode 218 is located opposite to the first electrode 120 with the liquid crystal layer 300 interposed therebetween. The alignment in the reflective portion 60R of the liquid crystal layer 300 is controlled by an electric field ER resulting from a potential difference between the third electrode 218 and the first electrode 120 (see FIG. 1).

Although the connection between the third electrode 218 and the driving circuit 70 is schematically illustrated in FIG. 1, etc. for the purpose of explanation, the potential is applied to the third electrode 218 through a wire in the circuit layer 114, the conductive particles interposed between the substrates 100 and 200, and the like. The third electrode 218 can be supplied with the potential independently of the potential application to the second electrode 124.

An alignment film not shown is disposed to cover the third electrode 218, the retardation layer 216, and the color filter 214 and is in contact with the liquid crystal layer 300.

The liquid crystal panel 60 further includes polarizing plates 128 and 220. The polarizing plate 128 is disposed on the outside of the element substrate 100, that is, on a side opposite to the liquid crystal layer 300 about the light-transmitting substrate 112. The polarizing plate 220 is disposed on the outside of the counter substrate 200, that is, on a side opposite to the liquid crystal layer 300 about the light-transmitting substrate 212.

The driving circuit 70 includes a variety of elements connected to the electrodes 120, 124, and 218 so as to generate and supply potentials to be applied to the electrodes 120, 124, and 218. The variety of elements are externally attached to, built in, or mounted on the liquid crystal panel 60 and includes, for example, pixel TFTs in the circuit layer 114. The driving circuit 70 generates the application potentials and applies the generated application potentials to the electrodes 120, 124, and 218 at predetermined times. The driving circuit 70 can perform the potential application to the second electrode 124 and the potential application to the third electrode 218, independently of each other.

An example of an operation of the liquid crystal display device 50 will be described. Here, it is assumed that the transmissive display is performed in the FFS type and the reflective display is performed in the ECB type, as described above. The liquid crystal layer 300 has a positive dielectric anisotropy and anisotropy of refractive index (also called a birefringence) Δn of 0.1.

The liquid crystal panel 60 is configured so that the transmissive display is a dark display having the lowest brightness when the potential difference between the first electrode 120 and the second electrode 124 is an OFF voltage and is configured so that the reflective display is a bright display having the highest brightness when the potential difference between the first electrode 120 and the third electrode 218 is an OFF voltage. The brightness of the transmissive display corresponds to the transmittance and the brightness of the reflective display corresponds to the reflectance. The dark display is called a dark state or a black display and the bright display is called a bright state or a white display. The voltage which embodies the dark display or the bright display and which hardly generates electric fields ET and ER is called an OFF voltage. On the contrary, the voltage which embodies the dark display or the bright display and which generates the electric fields ET and ER larger than those at the time of applying the OFF voltage is called an ON voltage.

Accordingly, the transmissive portion 60T is formed in a normally black type and the reflective portion 60R is formed in a normally white type. This configuration can be obtained by adjusting the material of the liquid crystal layer 300, the alignment state (so-called initial alignment state) of the liquid crystal layer 300 at the time of applying the OFF voltage, the rubbing direction of the alignment film, characteristics or arrangements of the polarizing plates 128 and 220 and the retardation layer 216, and the like.

In the liquid crystal display device 50, when the OFF voltage is applied across the first electrode 120 and the second electrode 124, the reflective portion 60R is allowed to make a dark display by applying the ON voltage across the first electrode 120 and the third electrode 218, thereby allowing the transmissive portion 60T and the reflective portion 60R to simultaneously make a dark display. That is, the entire pixel is allowed to make a dark display. On the other hand, when the OFF voltage is applied across the first electrode 120 and the third electrode 218, the transmissive portion 60T is allowed to make a bright display by applying the ON voltage across the first electrode 120 and the second electrode 124, thereby allowing the transmissive portion 60T and the reflective portion 60R to simultaneously make a bright display. That is, the entire pixel is allowed to make a bright display.

More specific examples are described below.

EXAMPLE 1

For example, at the time of an application of an OFF voltage, the liquid crystal 300 in the transmissive portion 60T and the reflective portion 60R is initially aligned so that major axes of liquid crystal molecules are substantially parallel to the surfaces of the electrodes 120, 124, and 218 and substantially parallel to the extending direction of the slits 126 (is accordingly aligned substantially perpendicular to the figure surface). The rubbing directions in the transmissive portion 60T and the reflective portion 60R are equal to each other. The polarizing plate 128 is disposed so that the transmission axis thereof is substantially perpendicular to the major axes of the liquid crystal molecules in the initially aligned state. The polarizing plate 220 is disposed so that the transmission axis thereof is substantially perpendicular to the transmission axis of the polarizing plate 128 (so-called perpendicular arrangement).

In this case, in the transmissive display at the time of the application of the OFF voltage (see FIG. 1), the light from backlight incident from the element substrate 100 is changed to a linearly polarized light substantially perpendicular to the major axes of the liquid crystal molecules by the polarizing plate 128. Since it is hardly affected by the birefringence effect of the liquid crystal 300 due to the relation between the polarized direction of the linearly polarized light and the alignment direction of the liquid crystal molecules, the linearly polarized light reaches the polarizing plate 220 with the polarized state thereof maintained. However, since the linearly polarized light is polarized substantially perpendicular to the transmission axis of the polarizing plate 220, the linearly polarized light cannot pass through the polarizing plate 220 and thus the transmissive display is a dark display.

As described above, when the OFF voltage is applied to the transmissive portion 60T, the ON voltage is applied to the reflective portion 60R and thus the reflective portion 60R makes a dark display (see FIG. 1). In the reflective portion 60R at the time of the dark display, the liquid crystal molecules are aligned in a direction substantially perpendicular to the surfaces of the electrodes 120 and 218. An external light incident from the counter substrate 200 is changed to a linearly polarized light by the polarizing plate 220, is changed to a circularly polarized light by the retardation layer 216 serving as a ¼ wave plate, and then enters the liquid crystal layer 300. Since the circularly polarized light is hardly affected by the birefringence effect of the liquid crystal 300 due to the above-mentioned alignment state of the liquid crystal molecules, the circularly polarized light reaches the reflective film 118 and is reflected therefrom with the polarized state thereof maintained. The reflected circularly-polarized light is then changed to a linearly polarized light by the retardation layer 216. However, since the rotation direction of the circularly polarized light (the rotation direction about the traveling direction) is inverted in the inward and outward paths, the linearly polarized light in the inward path is substantially perpendicular to the linearly polarized light in the outward path, that is, it is polarized in a direction substantially perpendicular to the transmission axis of the polarizing plate 220. Accordingly, the light cannot pass through the polarizing plate 220 and thus the reflective display is a dark display.

On the other hand, when the pixel makes a bright display, the OFF voltage is applied to the reflective portion 60R and the ON voltage is applied to the transmissive portion 60T as described above (see FIG. 2).

In the transmissive portion 60T, the liquid crystal molecules around the element substrate 100 are aligned in a direction substantially parallel to the surfaces of the electrodes 120 and 124 and substantially perpendicular to the extending direction of the slits 126 with the application of the ON voltage. On the other hand, the liquid crystal molecules around the counter substrate 200 are in the initial alignment state. Accordingly, the liquid crystal molecules in the transmissive portion 60T are aligned in a state twisted by 900 around the normal line of the electrodes 124 and 120 as a whole. In this case, the light from backlight linearly polarized by the polarizing plate 128 is polarized in a direction substantially parallel to the major axes of the liquid crystal molecules around the element substrate 100, rotates along the twisted alignment state of the liquid crystal molecules, and is changed to the linearly polarized light substantially parallel to the major axes of the liquid crystal molecules around the counter substrate 200 at the time of reaching the polarizing plate 220. Since the linearly polarized light is polarized substantially parallel to the transmission axis of the polarizing plate 220, the linearly polarized light passes through the polarizing plate 220 and thus the transmissive display is a bright display.

When the OFF voltage is applied to the reflective portion 60R, the liquid crystal 300 in the reflective portion 60R is aligned in the same way as the transmissive portion 60T to which the OFF voltage has been applied. In this case, the external light incident from the counter substrate 200 is affected by the birefringence of the liquid crystal layer 300 at the time of traveling along the same path (optical path) as the dark display. Here, the liquid crystal layer 300 in the reflective portion 60R is adjusted to act in the same way as the ¼ wave plate by the use of the birefringence thereof. The external light is changed to a circularly polarized light by passing through the polarizing plate 220 and the retardation layer 216, is changed to a linearly polarized light by the liquid crystal layer 300 serving as the ¼ wave plate, and then is reflected by the reflective film 118. The reflected linearly-polarized light is changed to a circularly polarized light by the liquid crystal layer 300 and then reaches the retardation layer 216. At this time, since the circularly polarized light in the inward path is equal in rotation direction to the circularly polarized light in the outward path, the linearly polarized light having passed through the retardation layer 216 again is substantially parallel to the linearly polarized light in the inward path, that is, is polarized substantially parallel to the transmission axis of the polarizing plate 220. Accordingly, it passes through the polarizing plate 220 and thus the reflective display is a bright display.

Although the dark display and the bright display have been described above, the brightness of a middle level between the dark display and the bright display, that is, a gray scale, can be also displayed by controlling the magnitude of the applied voltage.

In the above-mentioned configuration, the transmissive portion 60T employs an FFS system and the reflective portion 60R employs an ECB system. When the transmissive portion 60T is in the ON state, the reflective portion 60R is in the OFF state. When the reflective portion 60R is in the OFF state, the transmissive portion 60T is in the ON state. Accordingly, it is possible to obtain excellent display quality in both the reflective display and the transmissive display. Since the retardation layer 216 is built therein, it is not necessary to attach a retardation plate to the outer surface and it is possible to reduce the thickness of the liquid crystal panel in comparison with the other type transflective liquid crystal panel. Since the retardation layer 216 also serves as a layer for more narrowing a cell gap of the reflective portion 60R than the cell gap of the transmissive portion 60T, it is possible to reduce the number of manufacturing processes.

Since the reflective portion 60R employs the ECB system higher in reflectance than the FFS system, it is possible to obtain a reflective display with high brightness in comparison with the case where both the transmissive portion 60T and the reflective portion 60R employ the FFS system.

The reflective portion 60R does not employ the FFS system. Accordingly, even when the uneven surface is formed on the planarizing film 116, it is not necessary to form the electrode 124 having the slits 126 on the uneven surface. As a result, no slit patterning trouble occurs on the uneven surface and thus it is possible to obtain a reflective display with excellent display quality. In the transmissive display, a wide viewing angle and high contrast are realized by the FFS system.

In the FFS system, an ITO film or the like is usually formed on the outer surface of the counter substrate to block an external electric field. However, according to the above-mentioned configuration, it is not necessary to form a shielding structure in the outside. This is because the third electrode 218 of the counter substrate 200 has a shield function. Even when the third electrode 218 is not formed on the entire surface of the counter substrate 200 without any gap, it is possible to obtain the shielding function from the third electrode 218.

Since the retardation layer 216 is not disposed in the transmissive portion 60T, the wide viewing angle and the high contrast due to the FFS system are secured at the time of the transmissive display, unlike the case where a retardation film is attached to the outside without distinguishing the transmissive portion 60T and the reflective portion 60R from each other.

The cell gap in the reflective portion 60R is smaller than the cell gap in the transmissive portion 60T due to the retardation layer 216 (socalled multi-gap structure). Accordingly, it is possible to adjust the cell gap in the transmissive portion 60T and the reflective portion 60R without using a particular overcoat layer. For example, the cell gap in the reflective portion 60R can be adjusted to a value suitable for the ECB system.

Figure 3:
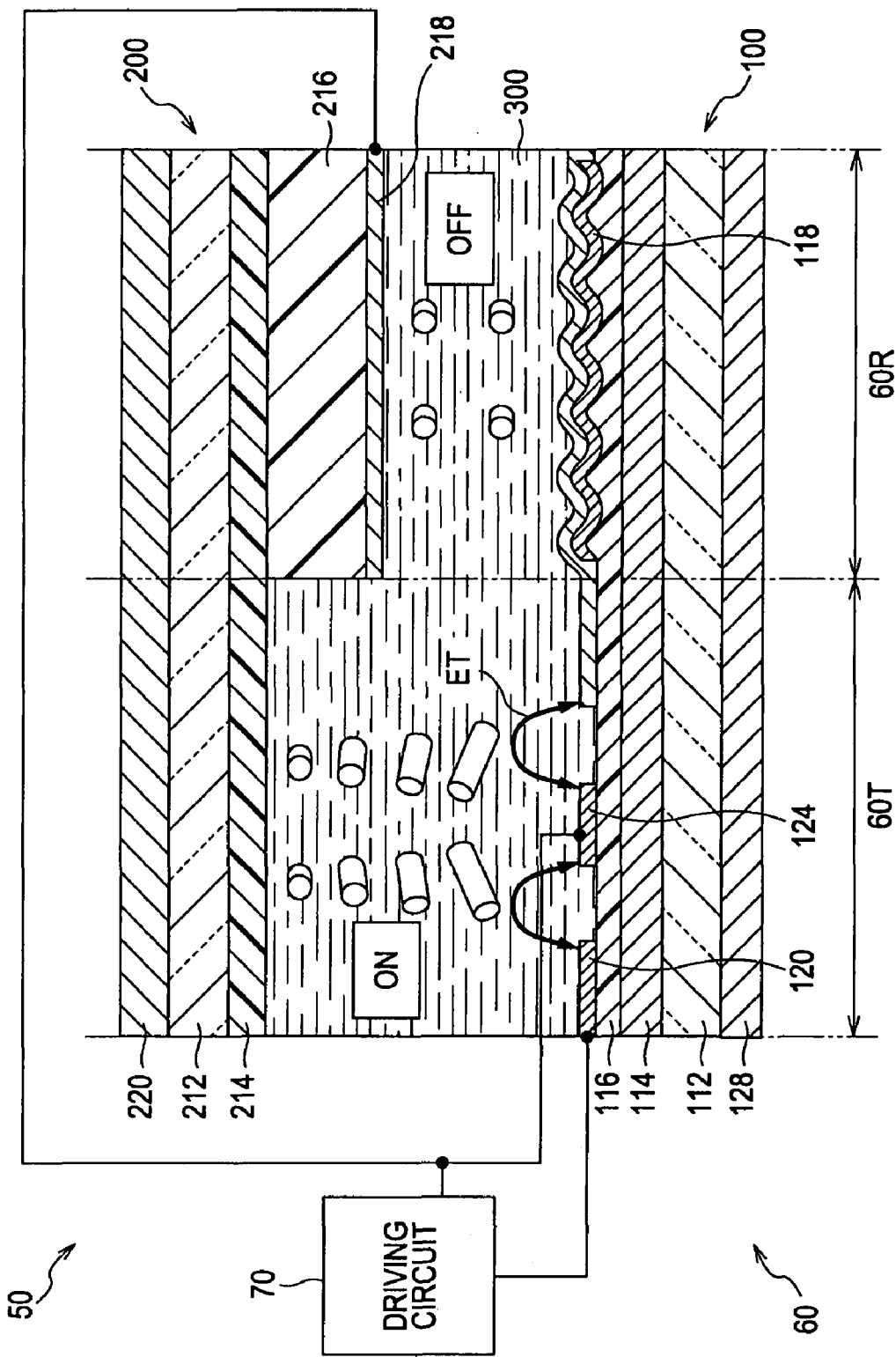
FIG. 3 is a schematic diagram illustrating a liquid crystal display device according to another embodiment of the invention.

Although it has been exemplified above that the transmissive display is performed in the FFS system, the transmissive display may be performed in the IPS (In-Plane Switching) system. In the IPS system, as shown in FIG. 3, the first electrode 120 and the second electrode 124 is disposed on the planarizing film 116 in the transmissive portion 60T, that is, in the same layer. A state where the entire pixel makes a bright display is shown in FIG. 3.

For example, By disposing the polarizing plates 128 and 220 so that the transmission axes are substantially parallel to each other, the normally black mode and the normally white mode may be exchanged.

Since the application of potential to the second electrode 124 and the application of potential to the third electrode 218 can be performed independently of each other, an application of potential different from the above-mentioned is possible. For example, when the threshold potentials are different in the transmissive portion 60T and the reflective portion 60R, it is possible to reduce a different in brightness between the transmissive display and the reflective display due to the difference by independently applying different potentials to the electrodes 124 and 218, thereby obtaining excellent display quality.

Next, among liquid crystal display devices in which a transverse electric field driving system is used in a transmissive display portion (transmissive portion) and a longitudinal electric field driving system is used in a reflective display portion (reflective portion), a liquid crystal display device having a TFT in which the transmissive display portion is in a normally white mode and the reflective display portion is in a normally black mode will be described with reference to FIGS. 4 to 7. Although it is described herein that a color filter is provided, a black display operation may be performed. A system other than the FFS system, for example, the IPS system, may be used as the transverse electric field driving system.

Figure 4:
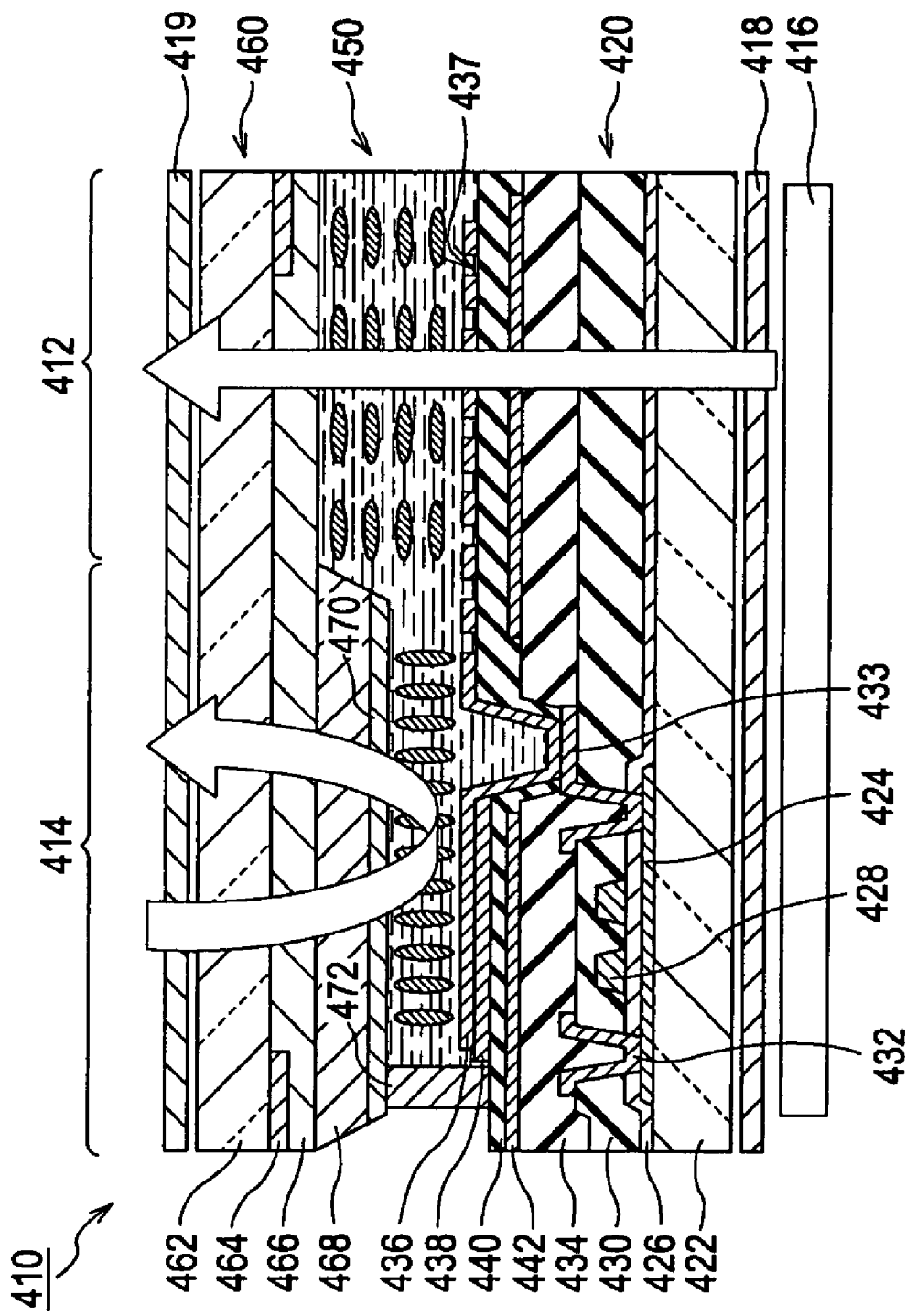
FIG. 4 is a cross-sectional view of a liquid crystal display device and is used to explain a mechanism in which a transmissive display portion of a transverse electric field driving system is in a normally white mode and a reflective display portion of a longitudinal electric field driving system is in a normally black mode.
Figure 5A:
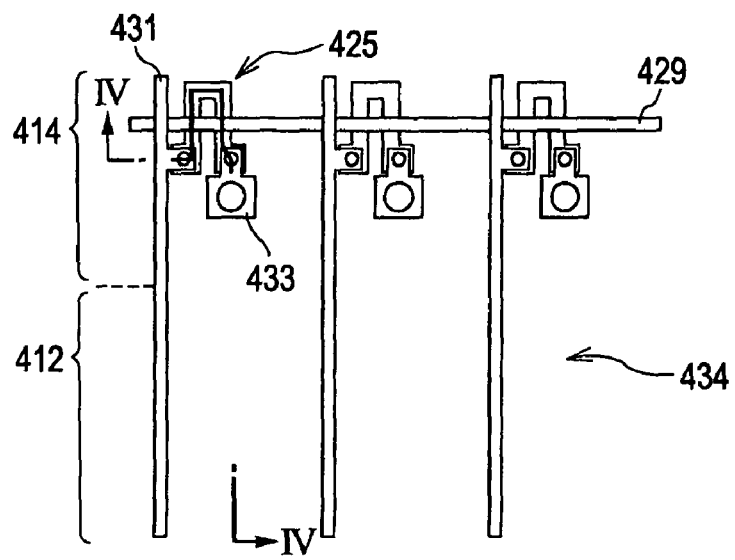
FIGS. 5A, 5B, and 5C are plan views corresponding to FIG. 4.
Figure 5B:
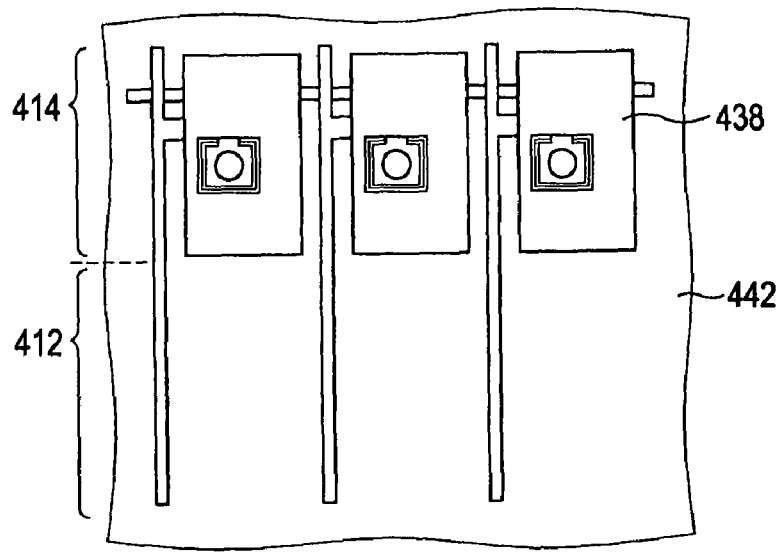
Figure 5C:
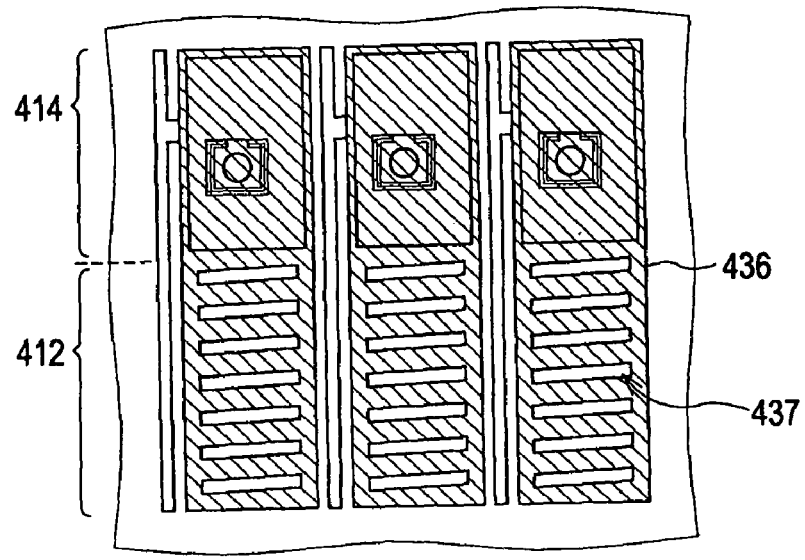
Figure 6:
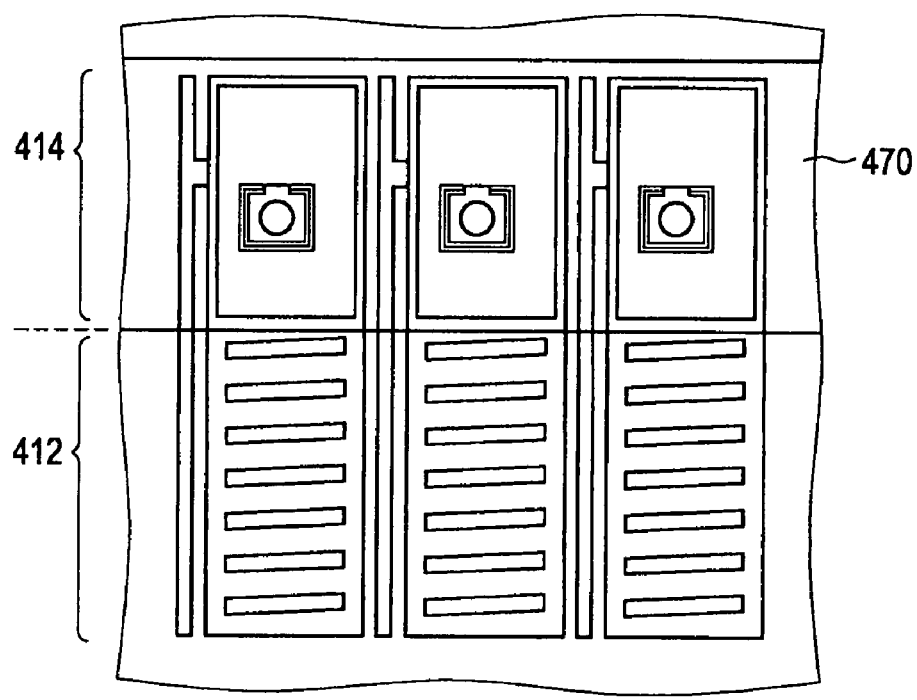
FIG. 6 is a plan view corresponding to FIG. 4 and illustrates a relation to a reflective-display common electrode.

FIGS. 4 to 6 are diagrams illustrating a configuration of a liquid crystal display device 410 in which the transverse electric field driving system is used in the transmissive display portion and the longitudinal electric field driving system is used in the reflective display portion. Here, the longitudinal electric field driving system means a system for driving the liquid crystal molecules by applying an electric field between the element substrate and the counter substrate. The FFS system for driving the liquid crystal molecules by applying an electric field between the common electrode and the pixel electrode disposed with an insulating layer interposed therebetween on the shame substrate is used as the transverse electric field driving system.

FIG. 4 is a partial sectional view of one sub pixel in the liquid crystal display device 410. Here, the sub pixels mean display portions corresponding to R, G, and B, for example, when a color display is made using R, G, and B. In this example, three sub pixels of a sub pixel of R, a sub pixel of G, and a sub pixel of B forms one unit, which serves as a pixel. The liquid crystal display device 410 includes a transmissive display portion 412 and a reflective display portion 414. In FIG. 4, the liquid crystal display device 410 includes a backlight unit 416, an element substrate 420 as a first substrate, a counter substrate 460 as a second substrate, a liquid crystal layer 450 interposed between the element substrate 420 and the counter substrate 460, an element-substrate polarizing plate 418 disposed between the backlight unit 416 and the element substrate 420, and a counter-substrate polarizing plate 419 disposed outside the counter substrate 460.

The counter substrate 460 is a side of the liquid crystal display device 410 facing a user. That is, the user views the darkness and brightness corresponding to the optical characteristics of the liquid crystal layer 450 from the counter substrate 460 side. In the transmissive display portion 412 of FIG. 4, the light emitted from the backlight unit 416 reaches the user's eyes through the element-substrate polarizing plate 418, the element substrate 420, the liquid crystal layer 450, the counter substrate 460, and the counter-substrate polarizing plate 419. In the reflective display portion 414, an external light reaches the liquid crystal layer 450 through the counter-substrate polarizing plate 419 and the counter substrate 460, is reflected by a reflective electrode 438 of the element substrate 420, and reaches again the user's eyes through the liquid crystal layer 450, the counter substrate 460, and the counter-substrate polarizing plate 419.

The counter substrate 460 has a structure in which several films are stacked. In the example shown in FIG. 4, a glass substrate 462, a black matrix 464, a color filter 466, a reflective area gap adjusting layer 468, a reflective-display common electrode 470 as a common electrode in the reflective display portion 414, and a spacer 472 are included from the counter-substrate polarizing plate 419 to the element substrate 420. The materials, sizes, forming methods, and the like can employ known methods of manufacturing a general active matrix liquid crystal display device and thus detailed description thereof will be omitted.

Here, since the optical path length of the reflective display portion 414 is double the optical path length of the transmissive display portion 412, the reflective area gap adjusting layer 468 is provided to use the half wave ($\lambda/2$) light modulation in the transmissive display mode and a quarter wave ($\lambda/4$) light modulation in the reflective display mode. As shown in FIG. 4, by providing the reflective area gap adjusting layer 468, a difference occurs between the thickness of the liquid crystal layer 450 in the reflective display portion 414 and the thickness of the liquid crystal layer 450 in the transmissive display portion 412. The thickness of the liquid crystal layer 450 is adjusted into the thickness of the reflective area gap adjusting layer 468 so that the phase difference of the reflective display portion 414 is $\Delta nd=\lambda/4$ and the phase difference of the transmissive display portion 412 is $\Delta nd=\lambda/2$. The structure of the reflective area gap adjusting layer is similarly used in the embodiments of the invention.

The element substrate 420 is also called, an element side substrate, a TFT substrate, or a TFT side substrate and is a substrate on which switching elements are disposed and which opposed to the counter substrate 460. Plural films patterned in a multi-layer structure are stacked on the element substrate 420 by the use of a known film forming technique and a pattern forming technique.

In the example of FIG. 4, the glass substrate 422, a semiconductor layer 424, a gate insulating film 426, a gate electrode 428, an interlayer insulating film 430, source/drain electrodes 432 and 433, an insulating film 434, a common electrode 442, an FFS insulating film 440, a reflective electrode 438, and a pixel electrode 436 are sequentially formed from the backlight unit 416 to the liquid crystal layer 450. The materials, sizes, forming methods, and the like can employ known methods of manufacturing a general active matrix liquid crystal display device and thus detailed description thereof will be omitted.

Here, the configuration associated with the FFS system in the transmissive display portion 412 includes the common electrode 442 formed on the insulating film 434 and the pixel electrode 436 disposed on the common electrode 442 with the FFS insulating film 440 interposed therebetween. The pixel electrode 436 is provided with slits 437 and an electric field is applied between the common electrode 442 and the pixel electrode 436 by the use of the slits 437, thereby driving the liquid crystal layer 450 in the transverse electric field driving system.

On the other hand, the configuration associated with the longitudinal electric field driving system in the reflective display portion 414 includes the common electrode 442 formed on the insulating film 434 and the pixel electrode 436 disposed on the common electrode 442 with the FFS insulating film 440 interposed therebetween and are different in that the reflective electrode 438 is disposed. Here, the reflective electrode 438 is formed after the common electrode 442 and the FFS insulating film 440 are formed and then is connected to the pixel electrode 436. The reflective electrode 438 is a conductive film having a function of reflecting and returning the light from the counter substrate 460 to the counter substrate 460. The common electrode 442 and the pixel electrode 436 have a function of forming a storage capacitor for driving the liquid crystal layer 450 with the FFS insulating film 440 interposed therebetween.

Although not shown in FIG. 4, an alignment film is disposed on the common electrode 442. Similarly, an alignment film is disposed on the surface of the counter substrate 460 facing the liquid crystal layer 450.

FIGS. 5A, 5B, and 5C are plan views corresponding to the cross-sectional view of FIG. 4. Here, one pixel consisting of three sub pixels is shown sequentially in the processes of forming the stacked structure of the element substrate 420. FIG. 4 corresponds to the cross-sectional view taken along line A-A of FIG. 5A. FIG. 5A shows a state when the insulating film 434 is formed on the source/drain electrodes 432 and 433 and a contact hole is formed therein, FIG. 5B shows a state when the common electrode 442 and the reflective electrode 438 are formed, and FIG. 5C shows a state when the pixel electrode 436 having the slits 437 is formed. In the example shown in FIG. 5, the common electrode 442 is formed over a plurality of pixels, but the common electrode 442 may be separated every sub pixel in some cases. However, assistant wires are required to supply potentials to the common electrodes.

FIG. 6 is a diagram illustrating a relation to the reflective-display common electrode 470 in the counter substrate. The reflective-display common electrode 470 is disposed on the counter substrate so as to face a part of the reflective display portion 414.

Referring to FIG. 5A again, in each sub pixel, a gate line 429 and a data line 431 are wired to be perpendicular to each other and a switching element 425 is disposed at the intersection. The gate line 429 serves a gate electrode 428 shown in FIG. 4 at the position of the switching element 425 and the data line 431 is connected to the source/drain electrodes 432 shown in FIG. 4. In this way, the liquid crystal display device 410 is a so-called active matrix type liquid crystal display device in which the switching elements 425 are disposed at the intersections between the plural gate lines 429 and the plural data lines 431. The gate lines 429 are also called scanning lines, scan lines, and scanning signal lines. The data lines 432 are also called signal lines, video signal lines, and image signal lines.

The switching element 425 is a transistor including a gate insulating film 426 formed on the semiconductor layer 424, a gate electrode 428 disposed thereon, and source/drain terminals connected to the source/drain electrodes 432 and 433 as shown in FIG. 4 and can include, for example, a TFT (Thin Film Transistor). One of the source/drain terminals of the switching element 425, for example, the drain terminal, is connected to the data line 431 and the other, for example, the source terminal, is connected to the pixel electrode 436. Since the drain and the source are compatible with each other, the source may be connected to the data line 431 and the drain may be connected to the pixel electrode 436. In the switching element 425, the drain and the source are electrically connected to each other by selecting the gate line 429 and thus a video signal from the data line 431 connected to the drain is supplied to the pixel electrode 436.

A display operation of the liquid crystal display device 410 having the above-mentioned configuration will be described below. Here, the relation between the polarizing axis of the polarizing plate and the alignment axis of the liquid crystal molecules is set as follows. That is, two polarizing plates outside the glass substrates 422 and 462, that is, the element-substrate polarizing plate 418 and the counter-substrate polarizing plate 419, are set so that the polarizing axes are perpendicular to each other and the polarizing axis of any one polarizing plate forms an angle of 45 degrees along with the alignment axis of the liquid crystal molecules in a state where a driving voltage supplied to the liquid crystal layer 450 is turned off. In the state where the driving voltage is turned off, the alignment axis of the liquid crystal molecules in the transmissive display portion 412 is parallel to the polarizing axis. On the other hand, the liquid crystal molecules in the reflective display portion 414 rise perpendicular to the surfaces of the glass substrates 422 and 462 in the state where the driving voltage is turned on.

With this configuration, in the transmissive display portion 412, the light incident from the backlight unit 416 is changed to a linearly polarized light through the element-substrate polarizing plate 418, has a phase difference of $\lambda/2$ to form a linearly polarized light rotating by 90 degrees at the time of passing through the liquid crystal layer 450, and passes through the counter-substrate polarizing plate 419, thereby making a white display (normally white), in the state where the driving voltage is turned off. As described above, in the transmissive display portion 412, the thickness of the liquid crystal layer 450 is adjusted to the phase difference of $\Delta nd = \lambda/2$. Accordingly, in the state where the driving voltage is turned on, no phase difference occurs even at the time of passing through the liquid crystal layer 450. Therefore, the incident linearly polarized light is absorbed by the counter-substrate polarizing plate 419, thereby making a black display.

On the contrary, the reflective display portion 414 in which the thickness of the liquid crystal layer 450 is adjusted to $\Delta nd = \lambda/4$ operates as follows. The incident light is changed to a linearly polarized light through the counter-substrate polarizing plate 419. In the state where the driving voltage is turned off, and the linearly polarized light is subjected to a phase difference of $\lambda/4$ at the time of passing through the liquid crystal layer 450 is changed to a clockwise circularly polarized light. Then, the resultant light is reflected and changed to a counterclockwise circularly polarized light by the reflective electrode 438 and is changed to a linearly polarized light turned by 90 degrees while passing through the liquid crystal layer 450. The resultant linearly polarized light is absorbed by the counter-substrate polarizing plate 419, thereby making a black display (normally black). In the state where the driving voltage is turned on, since the liquid crystal molecules rise perpendicular to the surfaces of the glass substrates 422 and 462, the incident light is not subjected to a phase difference at the time of passing through the liquid crystal layer 450. Accordingly, the reflected light is returned as the linearly polarized light and passes through the counter-substrate polarizing plate 419, thereby making a white display.

In this way, the variations in transmittance with the driving voltage, that is, the liquid crystal applied voltage, are opposite in the transmissive display portion 412 and the reflective display portion 414. That is, in the normally mode where the driving voltage is turned off, the transmissive display portion 412 makes a white display and is normally white, while the reflective display portion 414 makes a black display and is normally black. On the contrary, when the driving voltage is turned on, the transmissive display portion 412 makes a black display and the reflective display portion 414 makes a white display. In this way, the display is inverted in the transmissive display portion 412 and the reflective display portion 414 of the same sub pixel. This is a problem of a liquid crystal display device in which the transverse electric field driving system is used in the transmissive display portion and the longitudinal electric field driving system is used in the reflective display portion as described in the related art and is also a problem of the invention.

Figure 7:
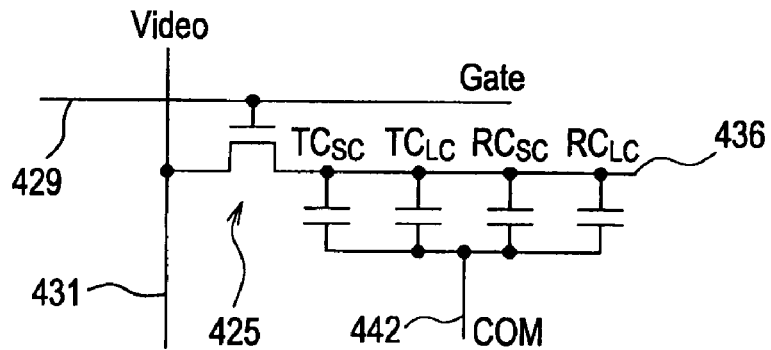
FIG. 7 is an equivalent circuit diagram of a pixel in a known liquid crystal display device.

A method of driving a liquid crystal display device will be described herein. FIG. 7 is an equivalent circuit diagram of a pixel. Here, the pixel means a sub pixel. Hereinafter, the method will be described by the use of the reference numerals shown in FIGS. 4 to 7. In the sub pixel, as described above, a switching element 425 is disposed at an intersection between a gate line 429 denoted by Gate and a data line 431 denoted by Video and a capacitor is formed between the pixel electrode 436 connected to the output terminal of the switching element 425 and the common electrode 442. In FIG. 7, a holding capacitor in the transmissive display portion 412 is denoted by $TC_{SC}$, a liquid crystal capacitor in the transmissive display portion 412 is denoted by $TC_{LC}$, a holding capacitor in the reflective display portion 414 is denoted by $RC_{SC}$, and a liquid crystal capacitor in the reflective display portion 414 is denoted by $RC_{LC}$. The holding capacitors $TC_{LC}$ and $RC_{LC}$ are formed between the pixel electrode 436 and the common electrode 442 with the FFS insulating film 440 interposed therebetween.

In the equivalent circuit, when the gate line 429 is selected by a driving circuit not shown, the switching element 425 is electrified, electric charges corresponding to the potential difference between the data line 431 and the common electrode 442 are accumulated in the capacitors $TC_{SC}$, $TC_{LC}$, $RC_{SC}$, and $RC_{LC}$, and an electric field resulting from the potential difference between the pixel electrode 436 and the common electrode 442 is applied to the liquid crystal layer 450 in the respective sub pixels. In the holding period when the gate line 429 is not selected, the potential of the pixel electrode 436 is held by the capacitors $TC_{SC}$, $TC_{LC}$, $RC_{SC}$, and $RC_{LC}$.

In the liquid crystal display device, in order to suppress deterioration in display quality such as burn-in, a high image signal voltage (positive) and a low image signal voltage (negative) relative to the common potential as the potential of the common electrode 442 are alternately input as the pixel potential which is the potential of the pixel electrode 436 with a predetermined cycle. That is, the liquid crystal layer 450 is driven in an AC manner. Two methods described below can be taken as an AC driving method of the liquid crystal layer 450.

One method is that the potential of the common electrode 442 is fixed to a predetermined value, in which the image signal voltage applied to the pixel electrode 436 is varied from a positive polarity to a negative polarity, and is also called a common electrode DC driving method. The other method is that the common electrode potential is varied between a high potential and a low potential with a predetermined cycle and is also called a common electrode AC driving method. In this case, the negative potential is used as the image signal voltage when the common electrode potential is high. On the contrary, the positive potential is used as the image signal voltage when the common electrode potential is low. In general, the common electrode AC driving method can more reduce the output amplitude of the image signal in comparison with the common electrode DC driving method, thereby suppressing the power consumption of the circuit and thus reducing the cost for the circuit.

A method of inverting the image signal voltage between the positive polarity and the negative polarity with a cycle of 1 vertical period is called a frame inversion driving method and a method of inverting the image signal voltage between the positive polarity and the negative polarity with a cycle of 1 horizontal period is called an H-line inversion driving method.

It is possible to suppress the burn-in or the like and to reduce the amplitude of the image signal, by using the common electrode AC driving method and the H-line inversion driving method. In addition, it is also possible to suppress roughness of the screen by means of averaging the display screen. Accordingly, as long as particularly not mentioned, it is assumed hereinafter that the common electrode AC driving method and the H-line inversion driving method are used.

Figure 8:
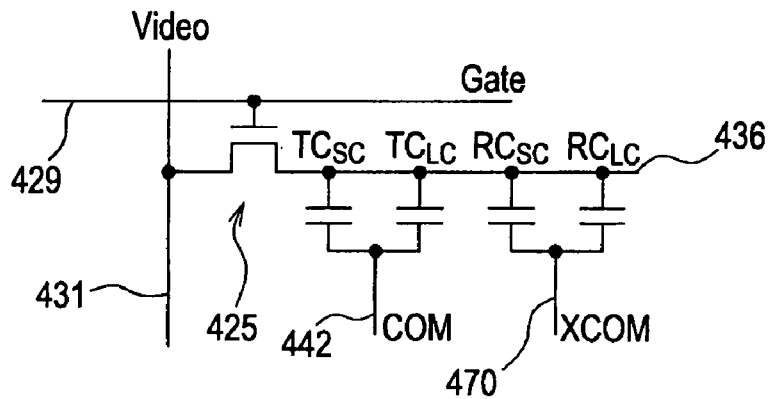
FIG. 8 is an equivalent circuit diagram of a pixel according to an embodiment of the invention.

An embodiment of the invention will be described now. The same elements as described with reference to FIGS. 3 to 7 are denoted by the same reference numerals and detailed description thereof is omitted. FIG. 8 is a diagram illustrating basic concept of an embodiment of the invention. That is, the common electrode is divided into the transmissive display portion 412 and the reflective display portion 414, which are supplied with the potentials independently of each other. Specifically, when it is assumed that the common electrode for the transmissive display portion 412 is called a transmissive-display common electrode 442 and the common electrode for the reflective display portion 414 is called a reflective-display common electrode 470, the potential of the transmissive-display common electrode 442 and the potential of the reflective-display common electrode 470 are opposite in phase to each other. In FIG. 8, the transmissive-display common electrode 442 is denoted by COM and the reflective-display common electrode 470 is denoted by XCOM, where X indicates the opposite phase.

The opposite phase means that one is at a high potential when the other is at a low potential and the other is at a high potential when one is at a low potential. A magnitude of one voltage amplitude may be different from the magnitude of the other voltage amplitude. A middle voltage of one voltage amplitude may be different from the middle voltage of the other voltage amplitude.

Figure 9:
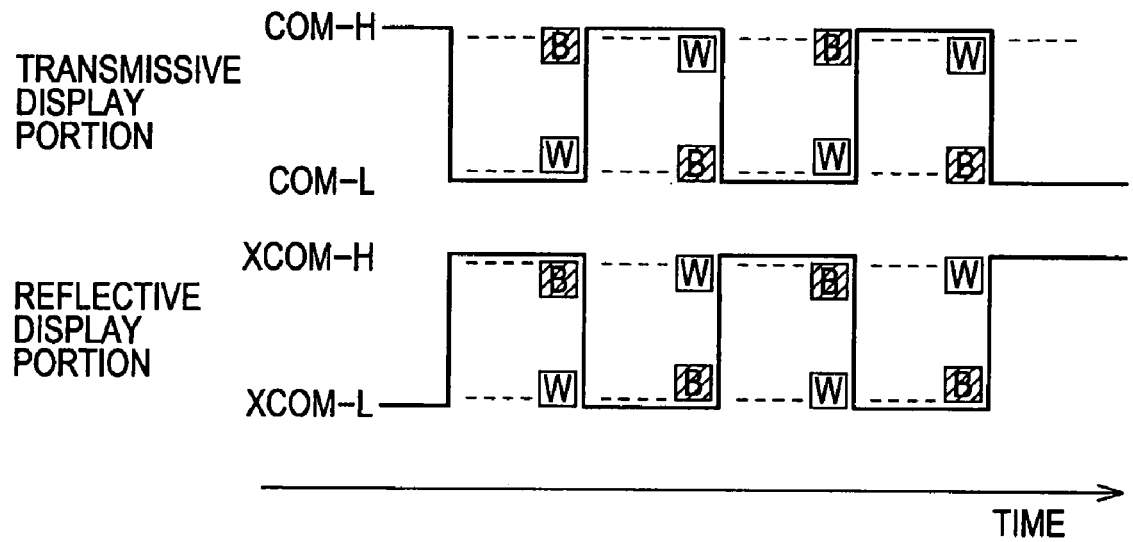
FIG. 9 is a diagram illustrating a variation in common potential and a correspondence between a display state of a transmissive display portion and a display state of a reflective display portion in a liquid crystal display device according to an embodiment of the invention by setting the horizontal axis to time.

A variation in common potential when the potential of the transmissive-display common electrode and the potential of the reflective-display common electrode are opposite in phase to each other and independent of each other, and a correspondence between a display state of the transmissive display portion and a display state of the reflective display portion are shown in FIG. 9. Here, the potential of the transmissive-display common electrode COM as the common electrode of the transmissive display portion and the potential of the reflective-display common electrode XCOM as the common electrode of the reflective display portion are opposite in phase to each other. The same image signal is supplied to the transmissive display portion and the reflective display portion.

For example, as described above, the liquid crystal display device is considered in which the transmissive display portion 12 is set to the normally white mode and the reflective display portion 14 is set to the normally black. Here, when it is assumed that the potential of the transmissive-display common electrode COM is at a low potential, that is, at COM-L, and the pixel electrode potential is at a high potential, the liquid crystal applied voltage is great to correspond to the state where the driving voltage is turned on, thereby making a black display. At the same time, the potential of the reflective-display common electrode XCOM is at a high potential, that is, at XCOM-H. Accordingly, since the liquid crystal applied voltage is small to correspond to the state where the driving voltage is turned off, thereby making a black display. Similarly, when the pixel electrode potential is at a low potential, the transmissive display portion and the reflective display portion both make a white display. At a different time, when the transmissive display portion makes a white display at COM-H and XCOM-L, the reflective display portion makes a white display and when the transmissive display portion makes a black display, the reflective display portion also makes a black display.

In this way, by setting the potential of the transmissive-display common electrode and the potential of the reflective-display common electrode to be opposite in phase to each other independently of each other, it is possible to embody a liquid crystal display device having a transverse electric field system with excellent display quality without inverting a display in the transmissive display portion and the reflective display portion. In addition, although it has been described that the transmissive display portion 412 is in the normally white mode and the reflective display portion 414 is in the normally black mode, the same is true in the case where the transmissive display portion 412 is in the normally black mode and the reflective display portion 414 is in the normally white mode. Hereinafter, examples having specific configurations corresponding to the basic principle will be described.

EXAMPLE 2

When the common potentials opposite in phase to each other are supplied to the transmissive display portion and the reflective display portion, the voltage applied to the liquid crystal layer every horizontal period may vary and thus affect the display quality in some cases. Accordingly, by providing two switching elements to one sub pixel, the pixel electrode can be independently driven in the transmissive display portion and the reflective display portion and thus the voltage applied to the liquid crystal layer at the time of inverting the common potential can be kept more constant. FIG. 7 is a diagram illustrating such a state. The same elements as described with reference to FIGS. 4 to 9 are denoted by the same reference numerals and detailed description thereof is omitted but uses the reference numerals shown in FIGS. 4 to 9. Here, one gate line 429 is provided with two switching elements 423 and 425. Since one switching element 423 is in the transmissive display portion 412, the output terminal thereof is connected to the transmissive-display common electrode 442 through a capacitor TC of the transmissive display portion 412. Since the other switching element 425 is in the reflective display portion 414, the output terminal thereof is connected to a reflective-display holding capacitor electrode 441 through a holding capacitor $RC_{SC}$ of the reflective display portion 414 and is connected to the reflective-display common electrode of the counter substrate 60 through the liquid crystal capacitor $RC_{LC}$.

Figure 10:
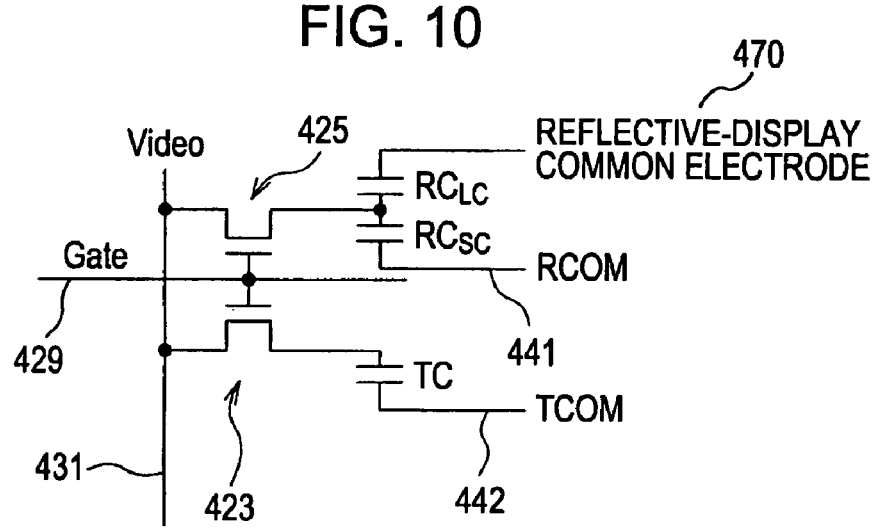
FIG. 10 is an equivalent circuit diagram of a specific pixel according to an embodiment of the invention.
Figure 11:
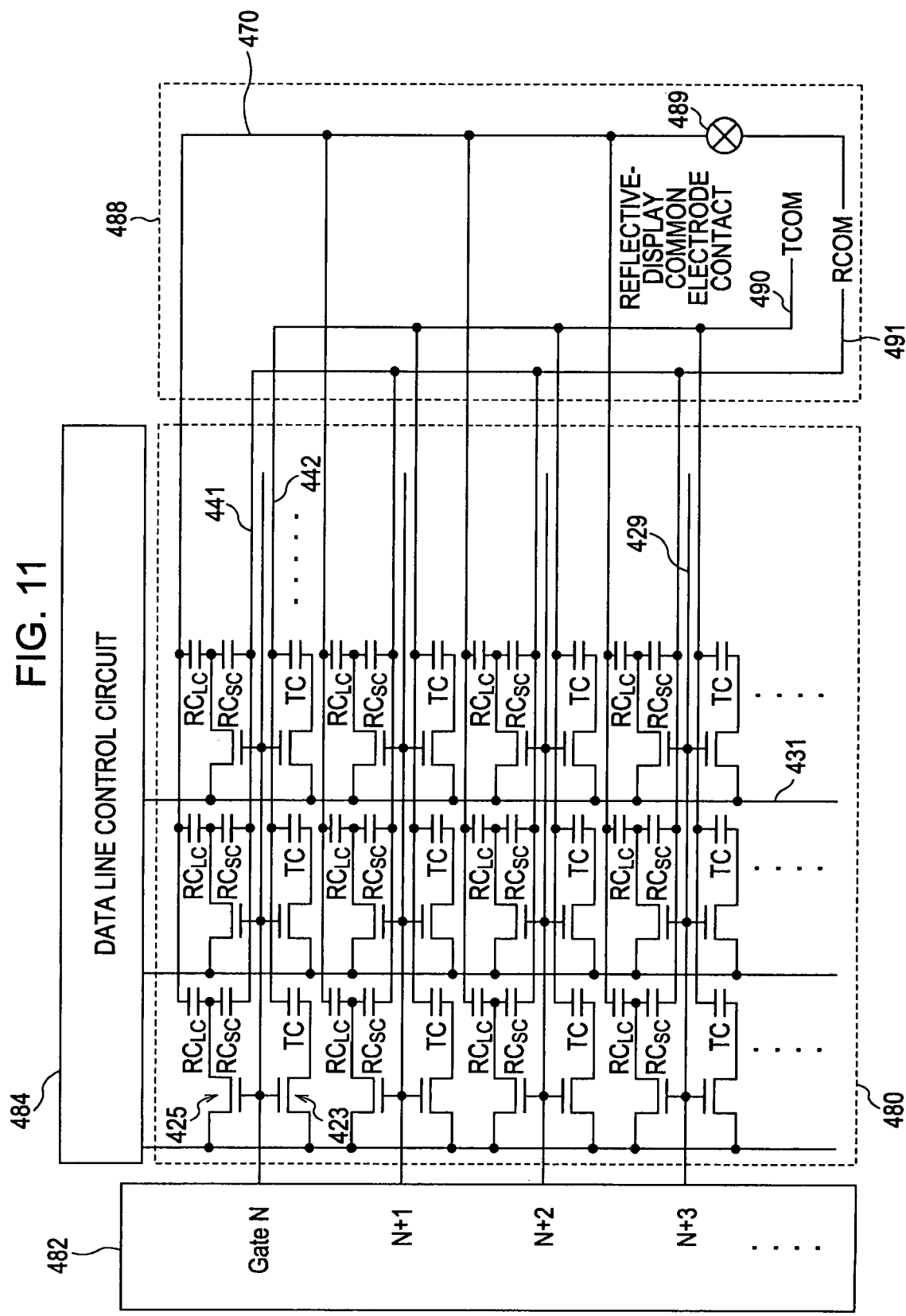
FIG. 11 is a diagram illustrating a configuration of a display driving operation of a liquid crystal display device according to an embodiment of the invention.

FIG. 11 is a diagram illustrating a configuration associated with a display driving operation of the liquid crystal display device in which a transmissive-display switching element and a reflective-display switching element are provided in one sub pixel. Hereinafter, the same elements as described with reference to FIGS. 4 to 10 are denoted by the same reference numerals and detailed description thereof is omitted but uses the reference numerals shown in FIGS. 4 to 10. Here, the switching element 423 for the transmissive-display portion 412 and the switching element 425 for the reflective-display portion 414 are provided in each sub pixel and the transmissive-display common electrode 442 for the transmissive display portion 412 and the reflective-display holding capacitor electrode 441 for the reflective display portion 414 are drawn out of the display area 480 every gate line 429 and are guided to the common electrode control circuit 488.

The transmissive-display common electrodes 442 of the gate lines are connected to each other outside the display area 480 to serve as a transmissive-display common electrode terminal 490. Similarly, the reflective-display holding capacitor electrodes 441 of the gate lines are connected to each other outside the display area 480 to serve as a reflective-display holding capacitor electrode terminal 491. In FIG. 11, the transmissive-display common electrode 490 is denoted by TCOM and the reflective-display holding capacitor electrode terminal 491 is denoted by RCOM. These are called terminals but may be connected simply.

The reflective-display common electrode 470 is also drawn out of the display area 480 and is connected to the element substrate 420 through a contact pad indicated as a reflective-display common electrode contact 489. Specifically, as shown in FIG. 11, the reflective-display holding capacitor electrode terminal 491 and the reflective-display common electrode 470 are connected to each other.

Figure 12:
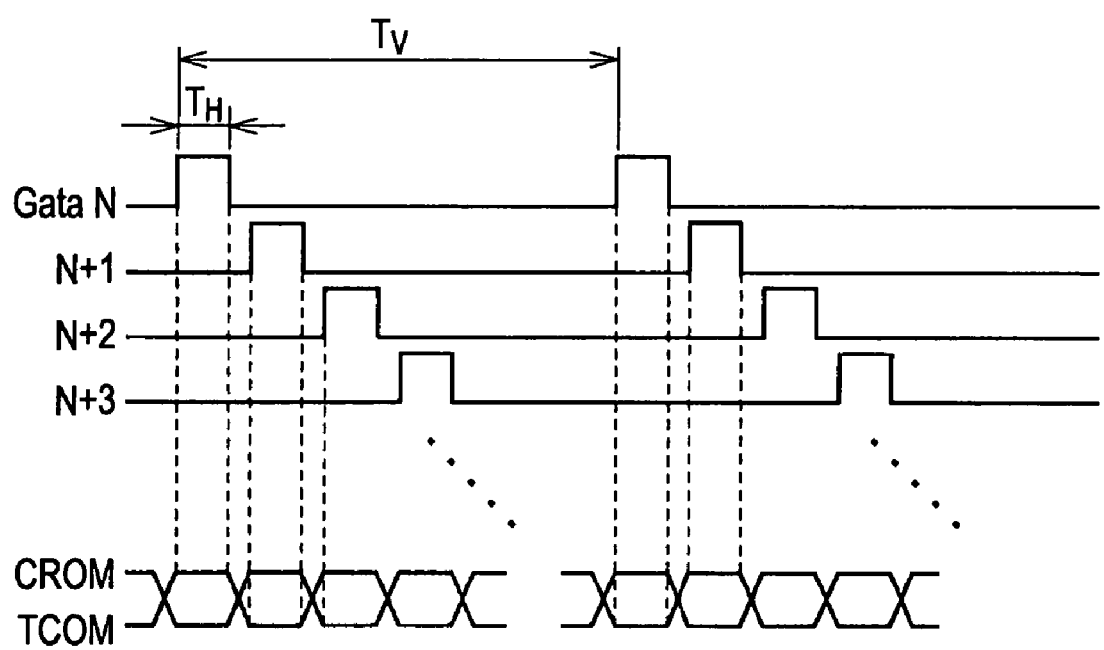
FIG. 12 is a timing diagram illustrating a potential of a common electrode corresponding to the configuration shown in FIG. 11.

FIG. 12 is a timing diagram of the configuration shown in FIG. 11. In FIG. 12, a variation in potential of the gate lines and a variation in potential of the transmissive-display common electrode terminal TCOM and the reflective-display common electrode terminal RCOM are shown. The same elements as described with reference to FIGS. 4 to 11 are denoted by the same reference numerals and detailed description thereof is omitted but uses the reference numerals shown in FIGS. 4 to 11.

The potential of the transmissive-display common electrode terminal TCOM and the potential of the reflective-display common electrode terminal RCOM vary as a set every horizontal period. The potential is inverted, for example, in a flyback time just before a selection signal is input to "Gate N" and the potential is held in the 1 horizontal period even after the selection signal is input. The potential of the transmissive-display common electrode terminal TCOM and the reflective-display common electrode terminal RCOM constituting a set are opposite in phase to each other.

The polarity of an image signal is inverted every horizontal period with a selection of a gate. For example, it is assumed that "Gate N" is selected and the negative image signal is input to the transmissive display portion corresponding to the gate line. In this case, since the common electrode potential is inverted in phase, the corresponding reflective display portion is subjected to a positive writing operation. Next, when "Gate N+1" is selected, the positive image signal is input to the transmissive display portion corresponding to the gate line. In this case, since the common electrode potential is inverted in phase, the corresponding reflective display portion is subjected to a negative writing operation.

By allowing the common electrode control circuit 488 to operate in accordance with the timing diagram, it is possible to make an excellent display without inverting a display in the transmissive display portion 412 and the reflective display portion 414 while performing the H-line inversion driving operation.

EXAMPLE 3

Figure 13:
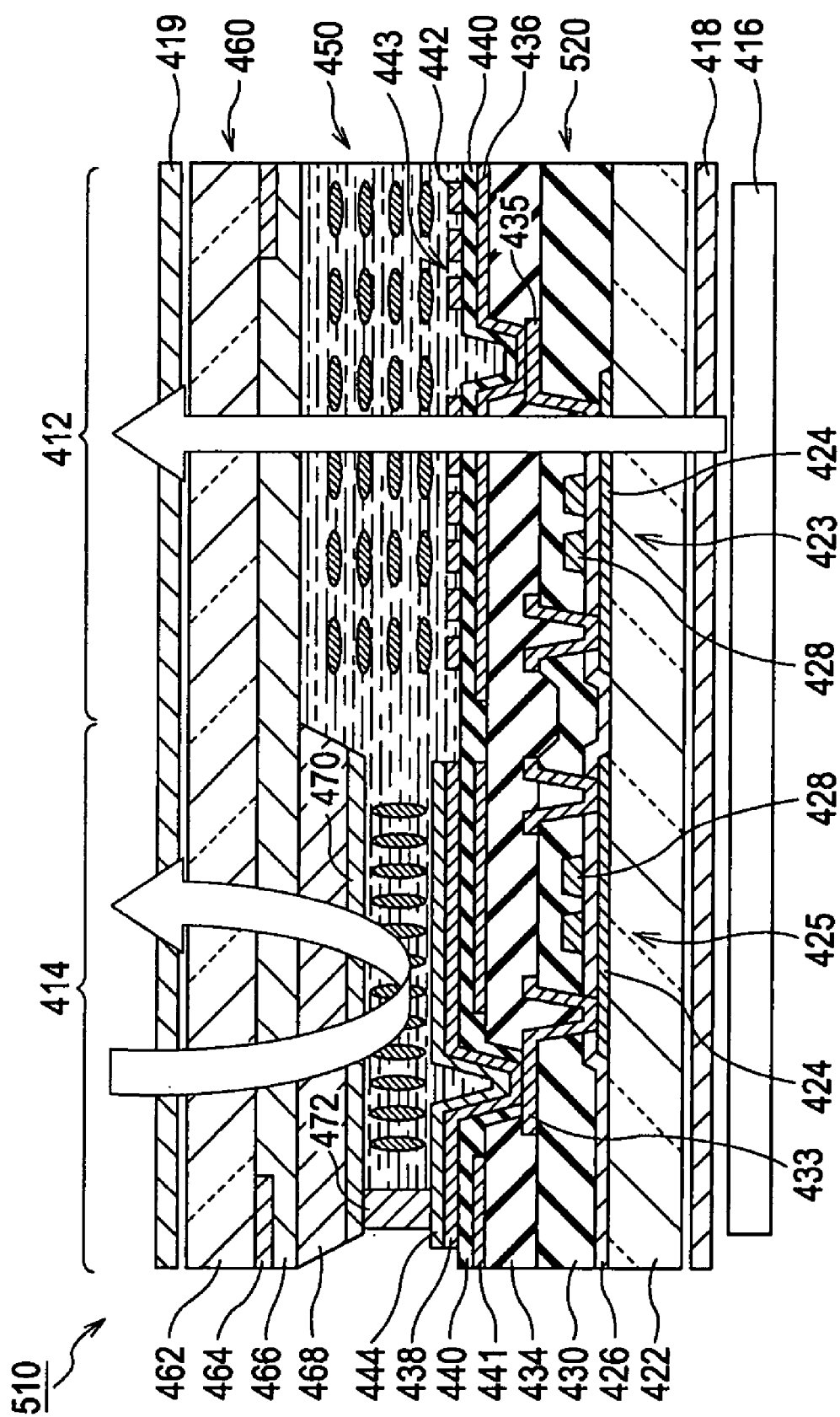
FIG. 13 is a cross-sectional view illustrating a liquid crystal display device according to an embodiment of the invention.
Figure 14A:
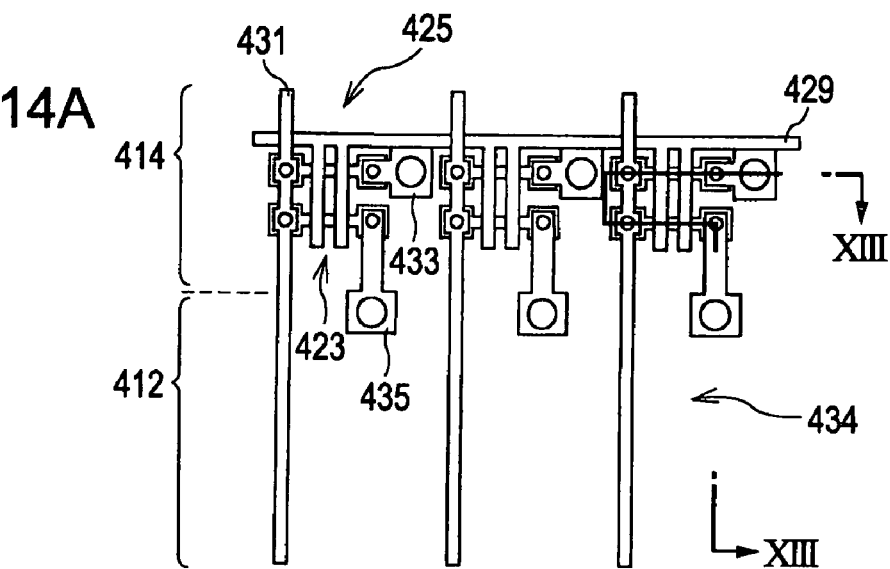
FIGS. 14A, 14B, and 14C are plan views corresponding to FIG. 13.
Figure 14B:
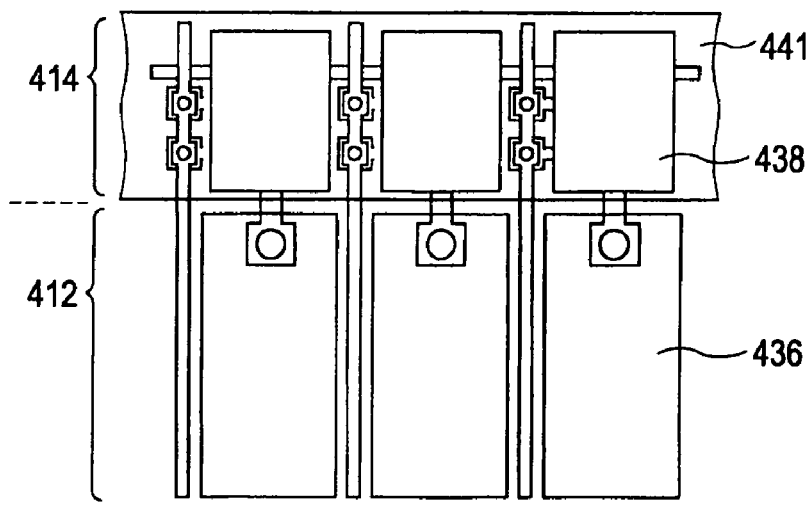
Figure 14C:
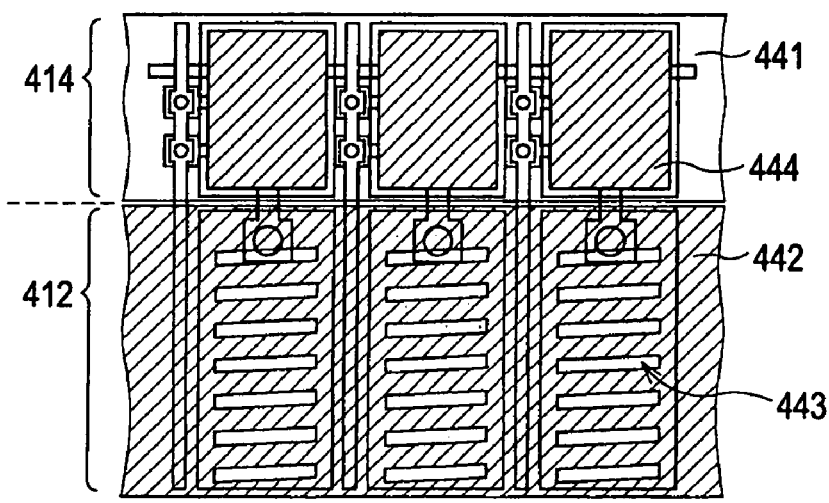

FIGS. 13 to 14C are a cross-sectional view and plan views illustrating a liquid crystal display device 510 employing the configuration shown in FIG. 10, respectively. The same elements as described with reference to FIGS. 4 to 12 are denoted by the same reference numerals and detailed description thereof is omitted but uses the reference numerals shown in FIGS. 4 to 12. FIG. 13 is a cross-sectional view of a sub pixel of the liquid crystal display device 510 and corresponds to FIG. 4. Here, two switching elements 423 and 425 are provided in one sub pixel. The switching element 423 is for the transmissive display portion 412 and the switching element 425 is for the reflective display portion 414.

The liquid crystal display device 510 has the same configuration as described with reference to FIG. 4 in the configurations other than the element substrate 520 and thus the configuration of the element substrate 520 will be described below. Plural films patterned in a multi-layer structure are stacked on the element substrate 520. In the example of FIG. 13, a glass substrate 422, a semiconductor layer 424, a gate insulating film 426, a gate electrode 428, an interlayer insulating film 430, source/drain electrodes 433 and 435, an insulating film 434, first transparent conductive films 436 and 441, an FFS insulating film 440, a reflective electrode 438, and second transparent conductive films 442 and 444 are sequentially formed from the backlight unit 416 to the liquid crystal layer 450. The materials, sizes, forming methods, and the like can employ known methods of manufacturing a general active matrix liquid crystal display device and thus detailed description thereof will be omitted.

The first transparent conductive films 436 and 441 are divided in the transmissive display portion 412 and the reflective display portion 414. The first transparent conductive film serves as the pixel electrode 436 of the FFS type in the transmissive display portion 412 and serves as the reflective-display holding capacitor electrode 441 of the longitudinal electric field driving type in the reflective display portion 414.

The second transparent conductive films 442 and 444 are divided in the transmissive display portion 412 and the reflective display portion 414. The second transparent conductive film serves as the common electrode 442 of the FFS type in the transmissive display portion 412 and serves as the pixel electrode 444 of the longitudinal electric field driving type in the reflective display portion 414.

Accordingly, in the configuration associated with the FFS system in the transmissive display portion 412, the first transparent conductive film 436 formed on the insulating film 434 serves as the pixel electrode 436 and the second transparent conductive film 442 disposed on the first transparent conductive film 436 with the FFS insulating film 440 interposed therebetween serves as the common electrode 442. The common electrode 442 is provided with slits 443 and an electric field is applied between the common electrode 442 and the pixel electrode 436 by the use of the slits 423, thereby driving the liquid crystal layer 450 in the transverse electric field driving system.

On the other hand, in the configuration associated with the longitudinal electric field driving system in the reflective display portion 414, the first transparent conductive film 441 formed on the insulating film 434 serves as the reflective-display storage capacitor electrode 441 and the second transparent conductive film 444 disposed on the first transparent conductive film 441 with the FFS insulating film 440 interposed therebetween serves as the pixel electrode 444. The reflective electrode 438 is provided then. Here, the reflective electrode 438 is formed after the first transparent conductive film 441 and the FFS insulating film 440 are formed, and then is connected to the second transparent conductive film 444. The reflective electrode 438 is a conductive film having a function of reflecting and returning the light from the counter substrate 460 to the counter substrate 460. The reflective-display storage capacitor electrode 441 and the pixel electrode 444 have a function of forming a storage capacitor for driving the liquid crystal layer 450 with the FFS insulating film 440 interposed therebetween. An alignment film is not shown herein, similarly to FIG. 4.

FIGS. 14A, 14B, and 14C are plan views illustrating a specific configuration. Here, two switching elements 423 and 425 are formed and two pixel electrodes and the common electrode and the reflective-display holding capacitor electrode are formed to correspond thereto. FIG. 14A shows a state when two switching elements 423 and 425 are formed to correspond to the transmissive display portion 412 and the reflective display portion 414, the source/drain electrodes 433 and 435 corresponding thereto are formed, and then two contact holes are formed therein, FIG. 14B shows a state when first transparent conductive films 436 and 441 are formed as the pixel electrode 436 of the transmissive display portion 412 and the reflective-display holding capacitor electrode 441 of the reflective display portion 414 and the reflective electrode 438 is formed thereafter, and FIG. 14C shows a state when second transparent conductive films 442 and 444 are formed as the common electrode 442 of the transmissive display portion 412 and the pixel electrode 444 of the reflective display portion 414.

As shown in FIG. 14B, the reflective-display holding capacitor electrode 441 of the reflective display portion 414 is drawn out of the display area. As shown in FIG. 14C, the common electrode 442 of the transmissive display portion 412 is drawn out of the display area 480 and is subjected to a predetermined connection in the common electrode control circuit 488 outside of the display area 480 as shown in FIG. 11.

Figure 15:
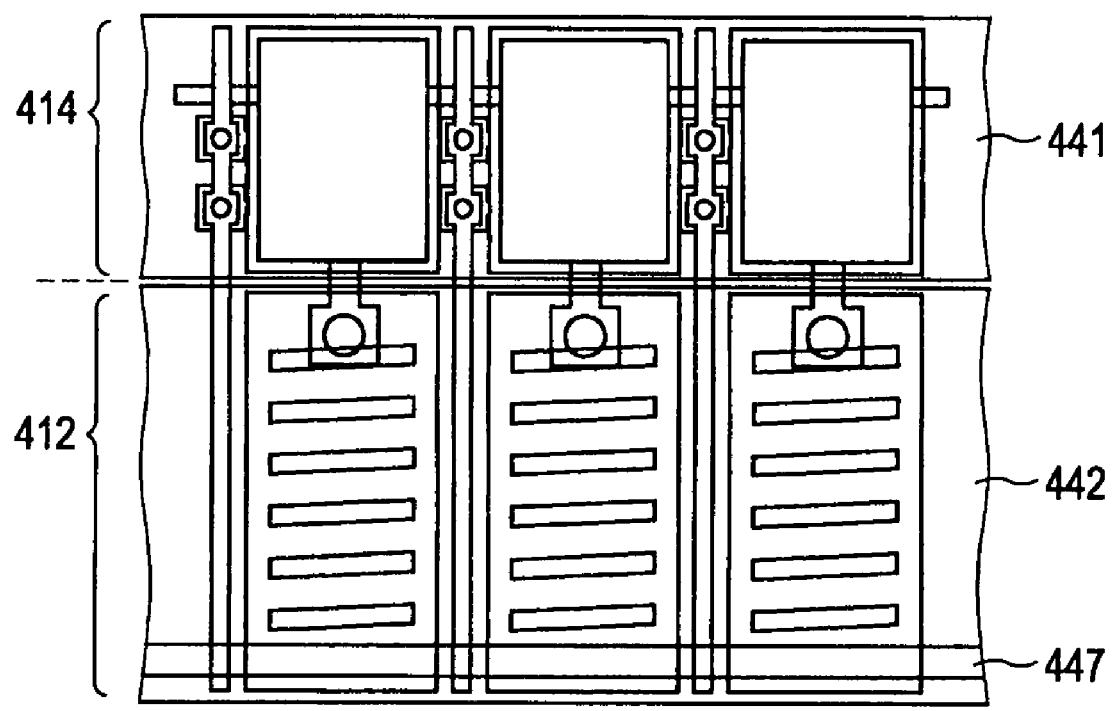
FIG. 15 is a diagram illustrating a modified example of FIGS. 14A to 14C.

A modified example of FIG. 14C is shown in FIG. 15. The transparent conductive film used as the common electrodes and the pixel electrodes are made of ITO (Indium Tin Oxide) or IZO (Indium Zinc Oxide). Since they generally have high resistance, the resistance values thereof may cause a problem at the time of drawing out the common electrodes out of the display area. On the contrary, the reflective electrode is made of aluminum, aluminum alloy, silver, or the like and thus has a resistance value lower than that of ITO or IZO. Therefore, the reflective electrode may be used to reduce the resistance of the common electrodes.

FIG. 15 shows a state where a drawn line 447 made of the same material as the reflective electrode is disposed in the transmissive display portion 412. In this way, the resistance can be reduced at the time of drawing the common electrode 442 out of the display area.

EXAMPLE 4

Figure 17A:
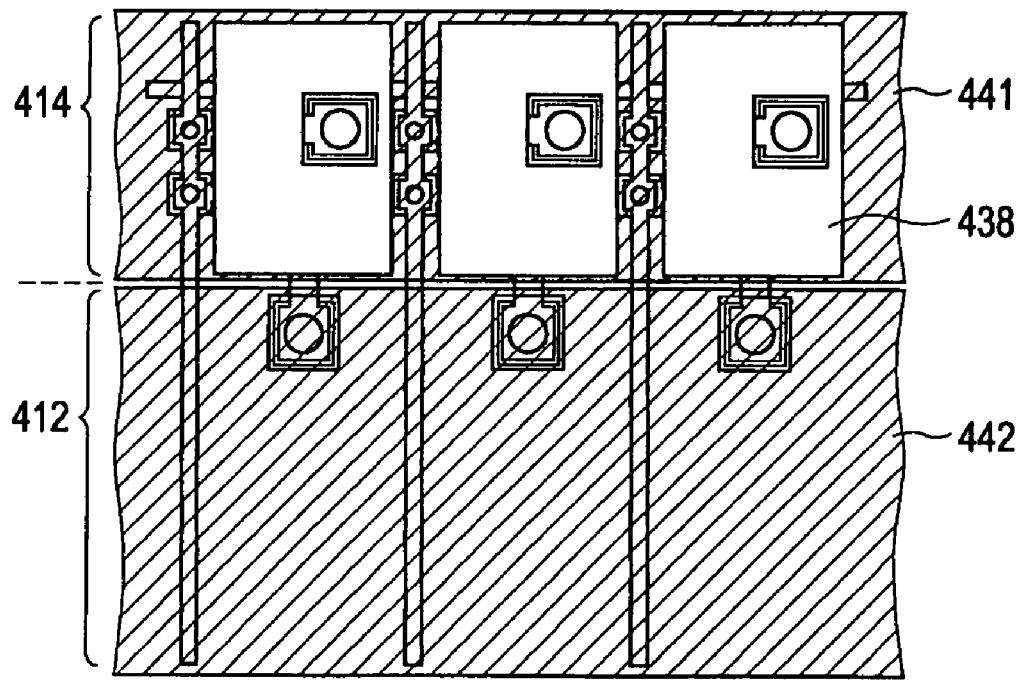
FIGS. 17A and 17B are plan views corresponding to FIG. 16.
Figure 17B:
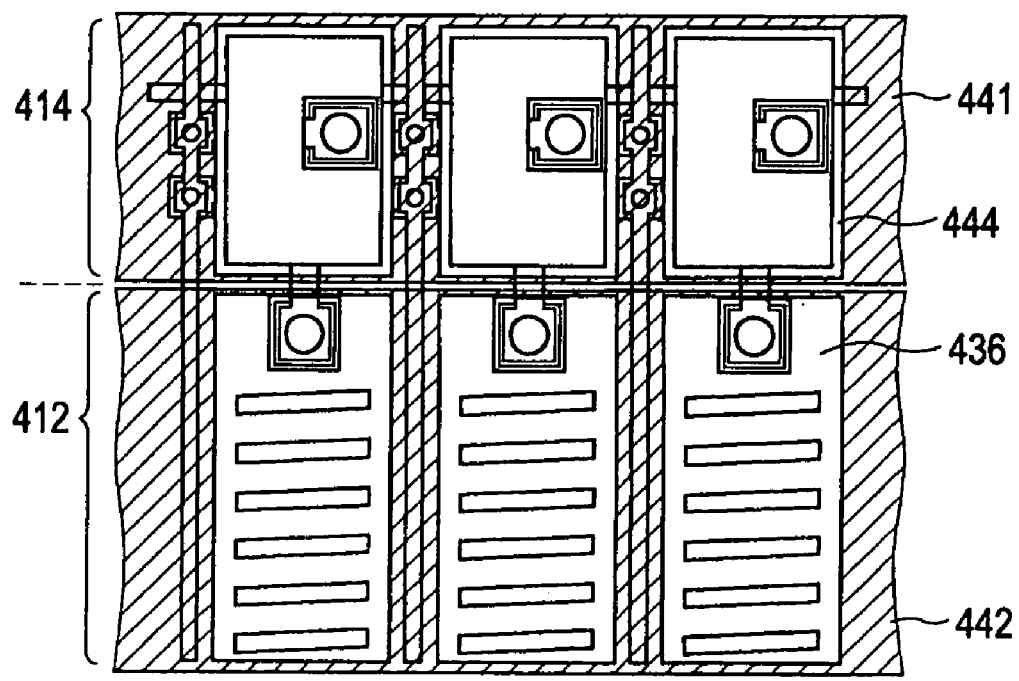

FIGS. 16 to 17B are a cross-sectional view and plan views illustrating the liquid crystal display device 510 employing shown in FIG. 10, respectively. The same elements as described with reference to FIGS. 4 to 15 are denoted by the same reference numerals and detailed description thereof is omitted but uses the reference numerals shown in FIGS. 4 to 15. FIG. 16 is a cross-sectional view of a sub pixel of a liquid crystal display device 511 and corresponds to FIG. 13. Here, a switching element 423 for the transmissive display portion 412 and a switching element 425 for the reflective display portion 414 are provided in one sub pixel, as described with reference to FIG. 13.

The liquid crystal display device 511 is different from the liquid crystal display device 510 described with reference to FIG. 13 in arrangement and use of the first transparent conductive films and the second transparent conductive films of the element substrate 521. Since the other configurations are equal to those described with reference to FIG. 13, the configuration of the element substrate 521 will be described below. Plural films patterned in a multi-layer structure are stacked on the element substrate 521. In the example of FIG. 16, a glass substrate 422, a semiconductor layer 424, a gate insulating film 426, a gate electrode 428, an interlayer insulating film 430, source/drain electrodes 433 and 435, an insulating film 434, first transparent conductive films 436 and 441, an FFS insulating film 440, a reflective electrode 438, and second transparent conductive films 436 and 444 are sequentially formed from the backlight unit 416 to the liquid crystal layer 450. The materials, sizes, forming methods, and the like can employ known methods of manufacturing a general active matrix liquid crystal display device and thus detailed description thereof will be omitted.

The first transparent conductive films 442 and 441 are divided in the transmissive display portion 412 and the reflective display portion 414. The first transparent conductive film serves as the common electrode 442 of the FFS type in the transmissive display portion 412 and serves as the reflective-display holding capacitor electrode 441 of the longitudinal electric field driving type in the reflective display portion 414.

The second transparent conductive films are divided in the transmissive display portion 412 and the reflective display portion 414 and both serve as the pixel electrodes 436 and 444. That is, the second transparent conductive film serves as the pixel electrode 436 of the FFS type in the transmissive display portion 412 and serves as the pixel electrode 444 of the longitudinal electric field driving type in the reflective display portion 414.

Accordingly, in the configuration associated with the FFS system in the transmissive display portion 412, the first transparent conductive film 442 formed on the insulating film 434 serves as the common electrode 442 and the second transparent conductive film 436 disposed on the first transparent conductive film 442 with the FFS insulating film 440 interposed therebetween serves as the pixel electrode 436. The pixel electrode 436 is provided with slits and an electric field is applied between the common electrode 442 and the pixel electrode 436 by the use of the slits, thereby driving the liquid crystal layer 450 in the transverse electric field driving system.

On the other hand, in the configuration associated with the longitudinal electric field driving system in the reflective display portion 414, the first transparent conductive film 441 formed on the insulating film 434 serves as the reflective-display storage capacitor electrode 441 and the second transparent conductive film 444 disposed on the first transparent conductive film 441 with the FFS insulating film 440 interposed therebetween serves as the pixel electrode 444. The reflective electrode 438 is provided then. Here, the reflective electrode 438 is formed after the first transparent conductive film 441 and the FFS insulating film 440 are formed, and then is connected to the second transparent conductive film 444. The reflective electrode 438 is a conductive film having a function of reflecting and returning the light from the counter substrate 460 to the counter substrate 460. The reflective-display storage capacitor electrode 441 and the pixel electrode 444 have a function of forming a storage capacitor for driving the liquid crystal layer 450 with the FFS insulating film 440 interposed therebetween. An alignment film is not shown herein, similarly to FIG. 10.

FIGS. 17A and 17B are plan views illustrating a specific configuration, correspond to FIGS. 14B and 14C, and show a state where two switching elements 423 and 425 are formed and two pixel electrodes and two common electrodes are formed to correspond thereto, as described with reference to FIG. 14A. FIG. 17A show a state when the first transparent conductive films 442 and 441 are formed as the common electrode 442 of the transmissive display portion 412 and the reflective-display holding capacitor electrode 441 of the reflective display portion 414 and then the reflective electrode 438 is formed and FIG. 17B shows a state when the second transparent conductive films 436 and 444 are formed as the pixel electrode 436 of the transmissive display portion 412 and the pixel electrode 444 of the reflective display portion 414.

As shown in FIG. 17B, the common electrode 442 of the transmissive display portion 412 and the reflective-display holding capacitor electrode 441 of the reflective display portion 414 are both drawn out of the display area 480 and is subjected to a predetermined connection in the common electrode control circuit 488 outside the display area 480, as described with reference to FIG. 8.

EXAMPLE 5

In Example 4, the common electrode potential is inverted every horizontal period. Accordingly, the rising time and the falling time may have an influence at the time of inversion, with a decrease in 1 horizontal period. This is a problem common to known liquid crystal display devices. A method of connecting to each other the common electrode lines which are independent of each other in the unit of gate line in the display area outside the display area by even lines and by odd lines and inputting the common electrode potential signals inverted every vertical period to the lines are disclosed in JP-A-2001-356356. Here, the common electrode potential of the even lines connected to each other and the common electrode potential of the odd lines connected to each other are opposite in phase to each other. The inversion of the common electrode potential is made every vertical period, that is, every frame scanning, as described above. The independent common electrode lines indicate independent lines by pixels.

Figure 18:
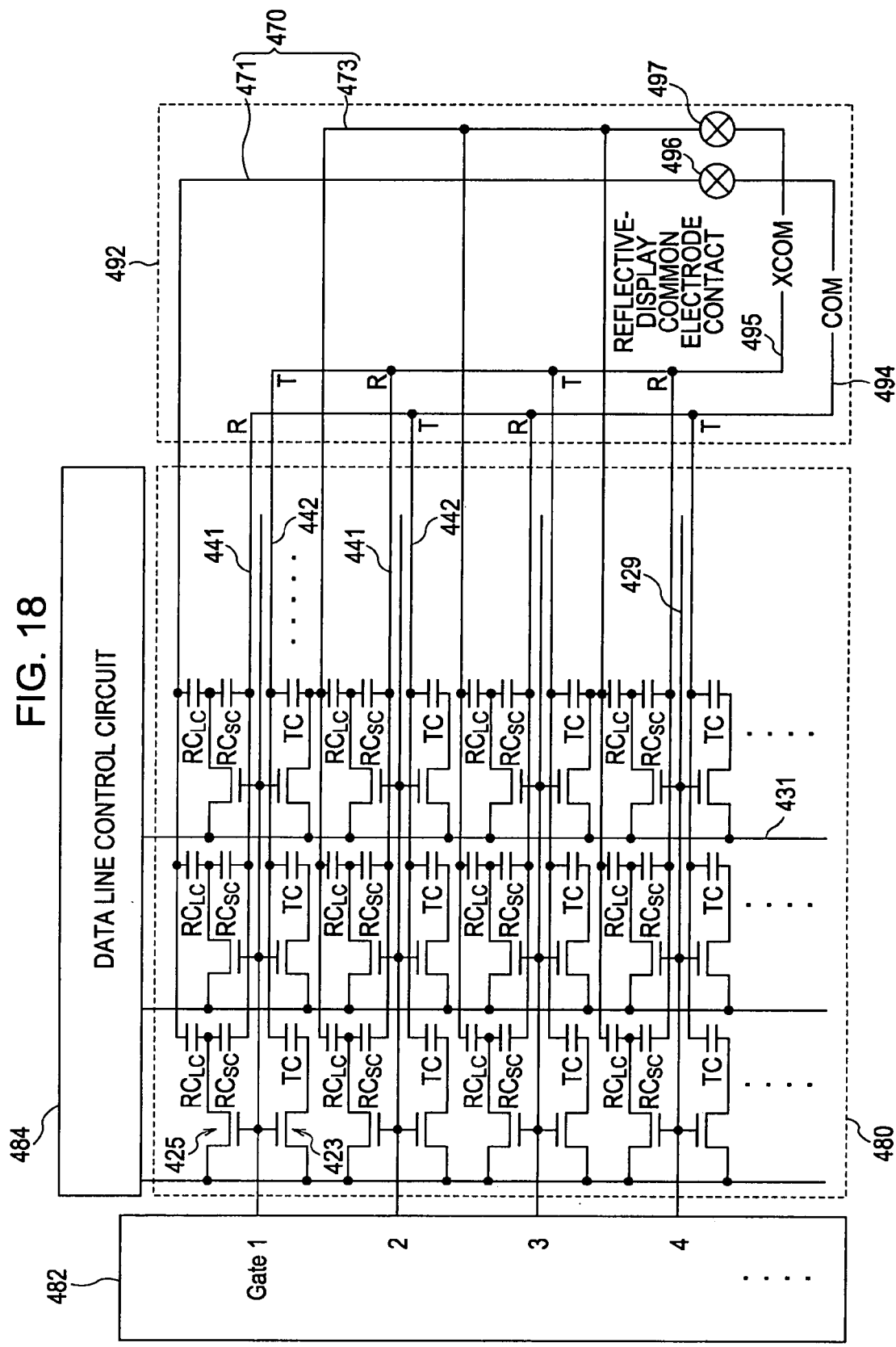
FIG. 18 is a diagram illustrating a configuration of a display driving operation of a liquid crystal display device according to another embodiment of the invention.

FIG. 18 is a diagram illustrating a configuration where the above-mentioned disclosure is changed to be applicable to the liquid crystal display device and corresponds to FIG. 11. The same elements as described with reference to FIGS. 4 to 17 are denoted by the same reference numerals and detailed description thereof is omitted but uses the reference numerals shown in FIGS. 4 to 17. Here, the reflective-display holding capacitor electrodes 441 in the odd lines of the gate lines 429 and the transmissive-display common electrodes 442 in the even lines thereof are connected as the first common electrode terminal 494 to each other outside the display area 480. The reflective-display holding capacitor electrodes 441 in the even lines of the gate lines 429 and the transmissive-display common electrodes 442 in the odd lines thereof are connected as the second common electrode terminal 495 to each other outside the display area 480.

Similarly to FIG. 11, in FIG. 18, the transmissive-display common electrode 442 for the transmissive display portion 412 and the reflective-display holding capacitor electrode 441 for the reflective display portion 414 are drawn out of the display area 480 every gate line 429 and are guided to the common electrode control circuit 492. The even and odd numbers are relative to each other. In FIG. 18, the reflective-display holding capacitor electrodes 441 of the first line, the third line, the fifth line, and the like and the transmissive-display common electrodes 442 of the second line, the fourth line, the sixth line, and the like are connected to each other to form the first common electrode terminal 494. The reflective-display holding capacitor electrodes 441 of the second line, the fourth line, the sixth line, and the like and the transmissive-display common electrodes 442 of the first line, the third line, the fifth line, and the like are connected to each other to form the second common electrode terminal 495. In FIG. 18, the first common electrode terminal 494 is denoted by COM and the second common electrode terminal 495 is denoted by XCOM.

Similarly, the reflective-display common electrodes 470 are drawn out of the display area 480 by the gate lines 429, are merged into the first reflective-display common electrode terminal 471 corresponding to the odd gate lines 429 and the second reflective-display common electrode terminal 473 corresponding to the even gate line 429, depending on the first common electrode terminal 494 and the second common electrode terminal 495, and are connected to the element substrate 420 through contact pads provided as reflective-display common electrode contacts 496 and 497. Specifically, as shown in FIG. 18, the first reflective-display common electrode terminal 471 is connected to the first common electrode terminal 494 and the second reflective-display common electrode terminal 473 is connected to the second common electrode terminal 495.

Figure 19:
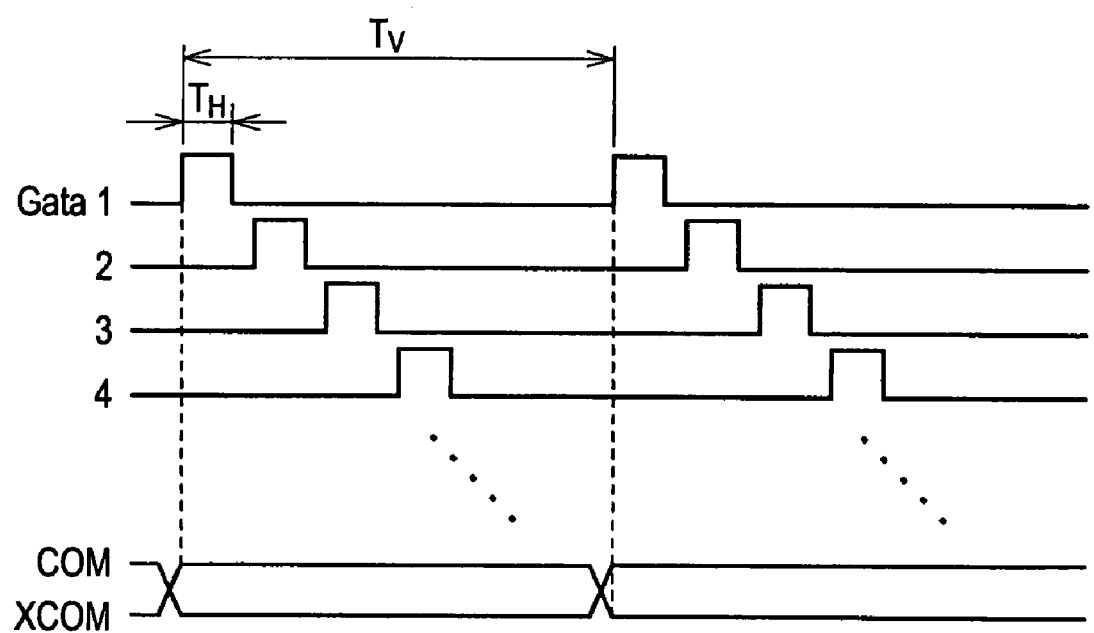
FIG. 19 is a timing diagram illustrating a potential of a common electrode corresponding to the configuration shown in FIG. 18.

FIG. 19 is a timing diagram of the configuration shown in FIG. 18 and corresponds to FIG. 12. In FIG. 19, a variation in potential of the gate lines and a variation in potential of the first common electrode terminal COM and the second common electrode terminal XCOM are shown. The same elements as described with reference to FIGS. 4 to 18 are denoted by the same reference numerals and detailed description thereof is omitted but uses the reference numerals shown in FIGS. 4 to 18.

The potential of the first common electrode terminal COM and the potential of the second common electrode terminal XCOM vary as a set every vertical period, that is, every frame scanning. The potential is inverted, for example, in the flyback time just before a selection signal is input to "Gate 1" and the potential is held in the 1 vertical period even after the selection signal is input. The potential of the first common electrode terminal COM and the second common electrode terminal XCOM, which constitutes a set, are opposite in phase to each other.

The polarity of an image signal is inverted every horizontal period with a selection of a gate. For example, it is assumed that "Gate 1" is selected and the negative image signal is input to the transmissive display portion corresponding to the gate line. In this case, since the common electrode potential is inverted in phase, the corresponding reflective display portion is subjected to a positive writing operation. Next, when "Gate 2" is selected, the positive image signal is input to the transmissive display portion corresponding to the gate line. In this case, since the common electrode potential is inverted in phase, the corresponding reflective display portion is subjected to a negative writing operation.

Since the common electrode control circuit 492 operates in accordance with the above-mentioned timing diagram, it is possible to make a display with excellent display quality without causing the display inversion between the transmissive display portion 412 and the reflective display portion 414 while performing the H-line inversion driving mode.

What is claimed is:

1. A liquid crystal display device comprising:
a first substrate;
a second substrate;
a liquid crystal interposed between the first substrate and the second substrate; and
pixels each having a transmissive portion for performing a transmissive display and a reflective portion for performing a reflective display,
wherein the first substrate includes:
a plurality of data lines and a plurality of gate lines;
a plurality of switching elements disposed to form a pair corresponding to each intersection between the plurality of data lines and the plurality of gate lines;
first electrodes disposed in the reflective portion and the transmissive portion connected to output terminals of the pair of switching elements, respectively; and
a plurality of second electrodes disposed only in the transmissive portion and driving the liquid crystal by applying an electric field between the first electrodes and the second electrodes,
wherein the second substrate includes a third electrode third electrode being disposed only in the reflective portion and driving the liquid crystal by applying an electric field between the first electrodes and the third electrode, and
wherein the potential of the second electrode and the potential of the third electrode are opposite in phase to each other; and
wherein the third electrodes in odd rows of the gate lines and the second electrodes in even rows thereof are connected as a first common electrode terminal to each terminal to each other outside the display area and the third electrodes in the even rows of the gate lines and the second electrodes in the odd rows thereof are connected as a second common electrode terminal to each other outside the display area, and
wherein the potential of the first common electrode terminal and the potential of the second common electrode terminal are opposite in phase to each other and the potential is alternated every vertical scanning period.

2. The liquid crystal display device according to claim 1, wherein the third electrodes of the gate lines are connected as a reflective-display common electrode terminal to each other outside a display area,
wherein the second electrodes of the gate lines are connected as a transmissive-display common electrode terminal to each other outside the display area, and
wherein the potential of the reflective-display common electrode terminal and the potential of the transmissive-display common electrode terminal are opposite in phase to each other and the potential is alternated every horizontal period.

3. The liquid crystal display device according to claim 2, wherein the first substrate has a reflective-display storage capacitor disposed in the reflective portion.

4. The liquid crystal display device according to claim 3, wherein the reflective-display storage capacitor has a reflective-display storage capacitor electrode that forms a storage capacitor along with the first electrode, and
wherein the potential of the reflective-display storage capacitor electrode is equal to the potential of the reflective-display common electrode terminal.

5. The liquid crystal display device according to claim 1, wherein the thickness of the liquid crystal is set so that a phase difference of the reflective portion is $\Delta nd=\lambda/4$ and a phase difference of the transmissive portion is $\Delta nd=\lambda/2$.

* * * * *